Aug. 26, 1947.　　　T. A. BANNING, JR　　　2,426,334
WING FOR AIRPLANES AND THE LIKE
Filed Oct. 15, 1943　　　4 Sheets-Sheet 1
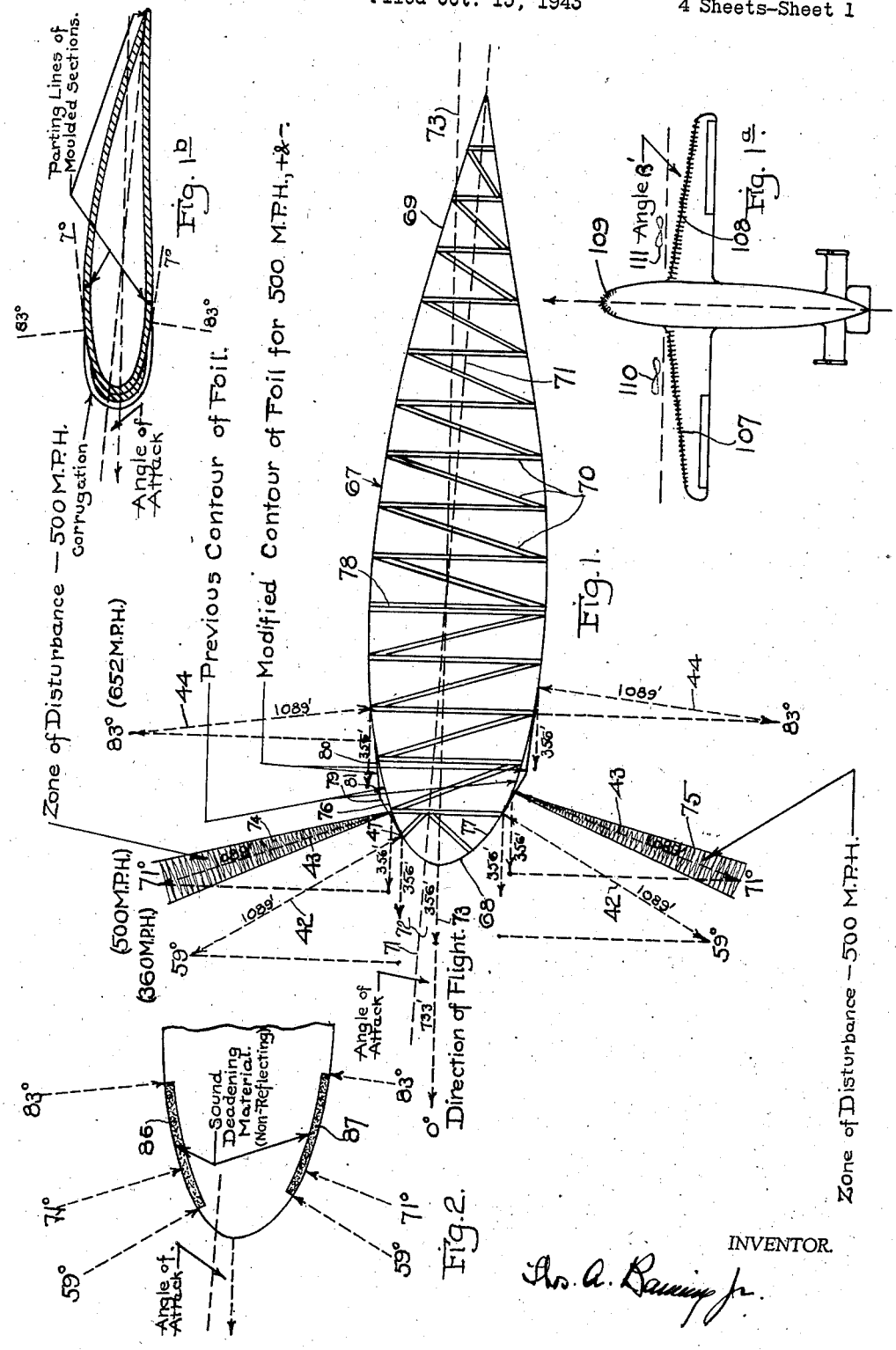
INVENTOR.
Thos. A. Banning Jr.

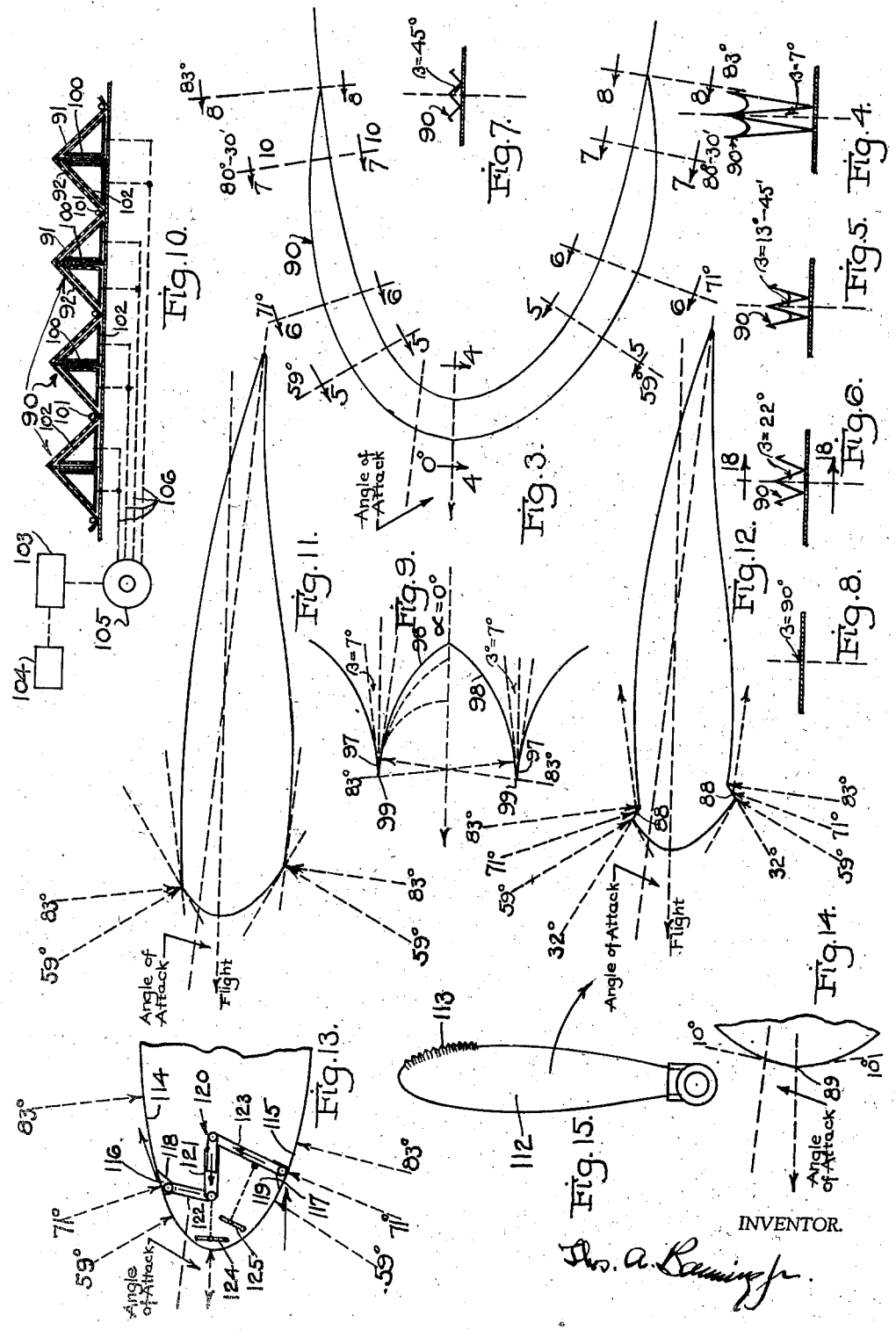

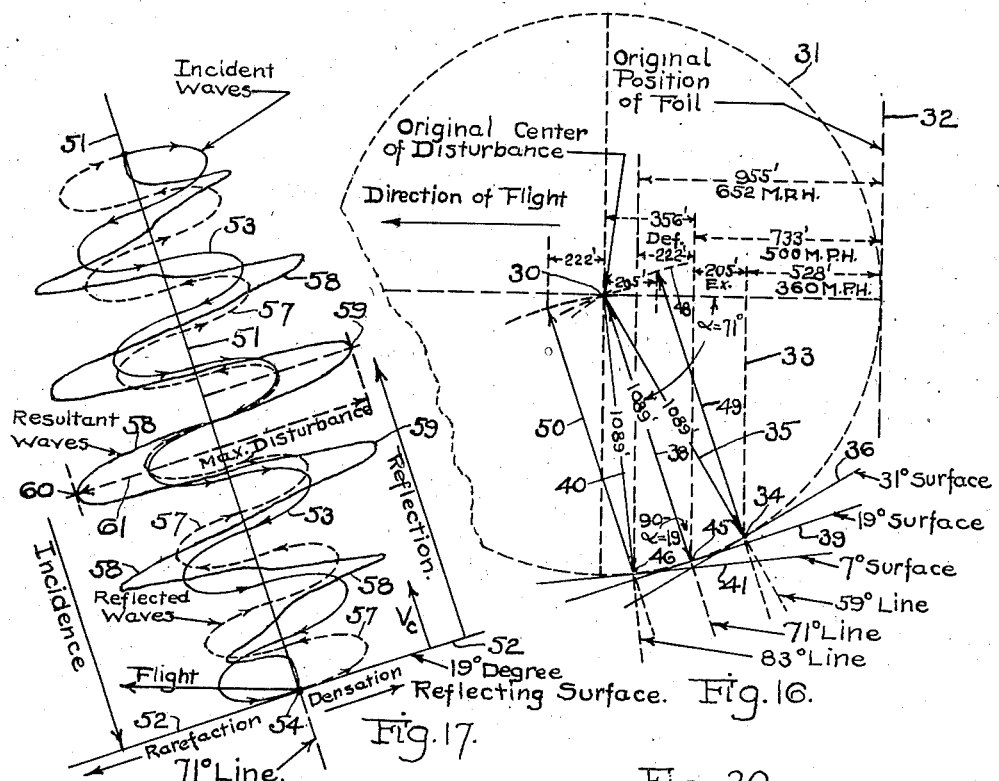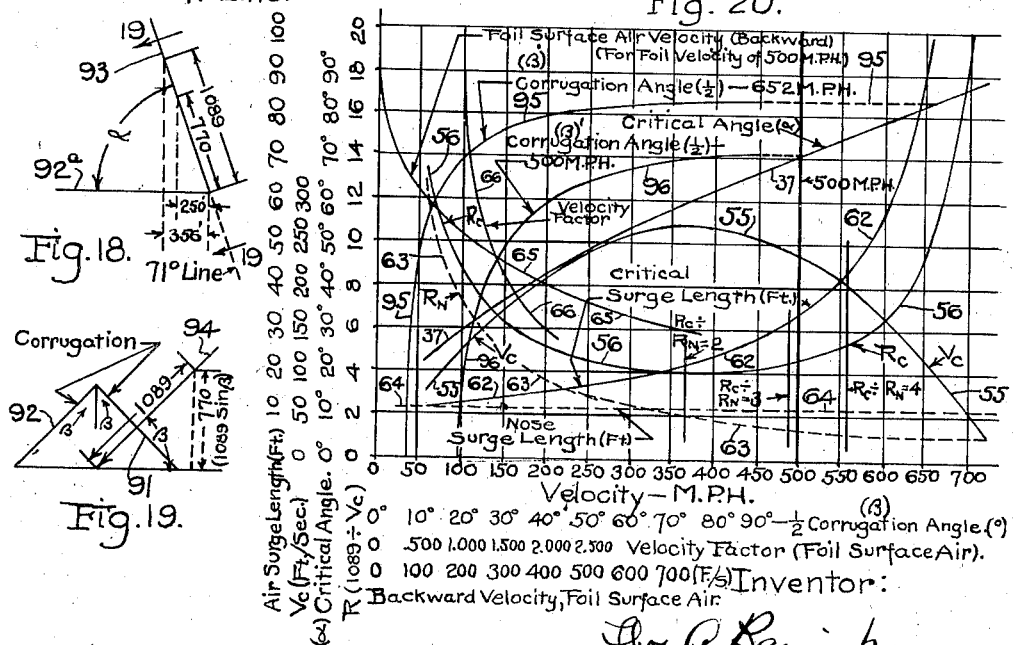

Aug. 26, 1947.  T. A. BANNING, JR  2,426,334
WING FOR AIRPLANES AND THE LIKE
Filed Oct. 15, 1943   4 Sheets-Sheet 4
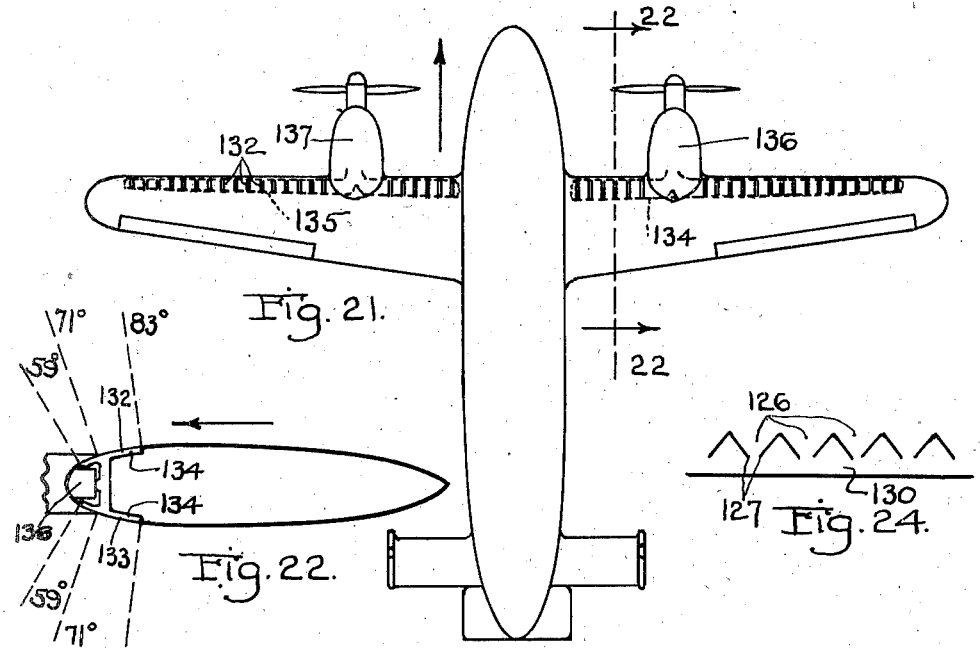
Fig. 21.
Fig. 22.
Fig. 24.
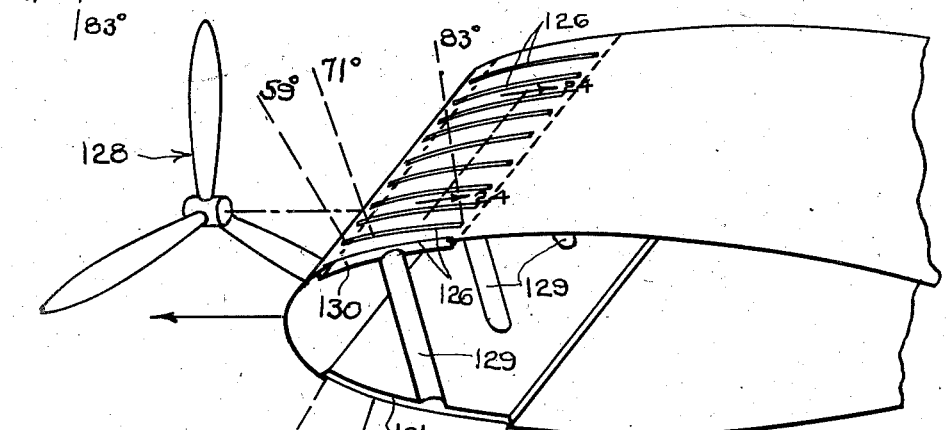
Fig. 23.
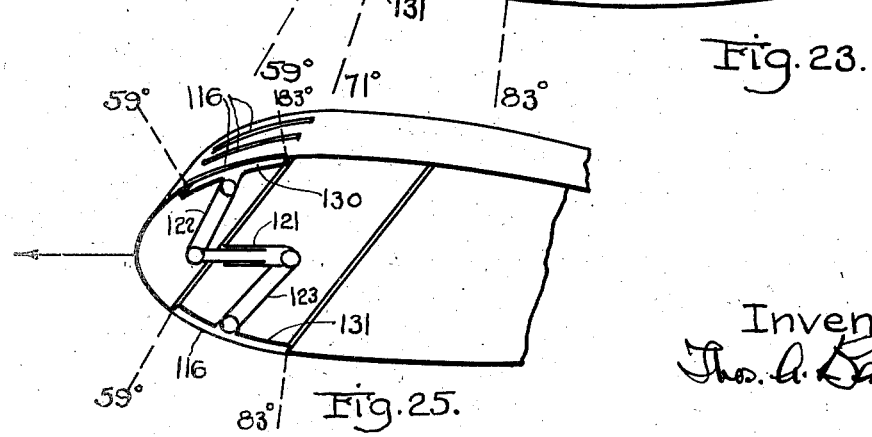
Fig. 25.
Inventor:
Thos. A. Banning Jr Patented Aug. 26, 1947

2,426,334

UNITED STATES PATENT OFFICE 2,426,334

WING FOR AIRPLANES AND THE LIKE

Thomas A. Banning, Jr., Chicago, Ill.

Application October 15, 1943, Serial No. 506,302

3 Claims. (Cl. 244—41)

1

The present invention has to do with improvements in aerodynamic structures, especially those which constitute important parts or elements of airplanes and the like. Certain features of the invention are also well adapted for use in connection with parts of structures other than airplanes, but since I have developed my present invention with especial reference to airplane conditions and requirements I shall first describe the use of the invention in connection with such structures, but without intending to thereby limit the scope or usefulness of the invention, except as I may do so in the claims to follow.

Generally speaking the features of the present invention have been devised to meet operating conditions of airplanes intended for high velocity operation, as for example 500 M. P. H. and above; but certain of the features are also applicable to airplanes intended for lower velocity operation. I shall, however, in order to better explain the principles of the invention, and the manner in which operations at these high velocities are improved, first refer to operating conditions at these high velocities. When I speak of "high velocities" I also refer to velocities of travel approximating the velocity of sound in air.

It has been observed that as the velocity of the airfoil such as a wing of an airplane is increased there occurs a velocity above which the power required to move the foil through the air increases very rapidly, and in fact at a rate much greater than the proportionate rate of increase of velocity of the foil. Such great increase of power has been observed to occur at foil velocities of substantially three hundred to three hundred fifty miles per hour; and while it has heretofore been possible in some cases to drive airplane velocities above such points, still this has been accomplished only by expenditure of greatly increased power, and in fact by pushing the applied power higher and higher at rates greatly in excess of the proportionate rate of travel of the foil through the air.

It has also been observed that when velocities of foil travel are pushed above substantially the amounts above mentioned there generally occurs a rapid increase of disturbance in the air stream flowing backward over the foil surface, and that such disturbance serves to greatly interfere with the smooth and natural flow of the air stream. The lifting power of the foil depends largely on the maintenance of a smooth and unruffled flow of the air stream over the foil surface, and the disturbances above referred to and which have

2 been heretofore observed severely limit the lifting power of the foil, as well as bringing about other serious consequences. These disturbances of the smooth flow of the air stream are greatly desired to be limited or even prevented, and it is a prime feature of the present invention to provide means and arrangements whereby such disturbances may and will be prevented, even when moving the foil through the air at velocities greatly above 300–350 M. P. H., and even greatly above 500 M. P. H., and approximating the velocity of sound in air.

In connection with the disturbances to the smooth and regular flow of the air stream over the foil surfaces at such high velocities as above mentioned, it has also been frequently observed that severe surges or other powerful waves of air frequently occur especially over the rear or tail portions of the foils, and over the elevator and rudder surfaces, sometimes becoming so violent as to seriously damage or even destroy the foils and other parts, or the airplane itself. This is sometimes known as "flutter." Flutter will occur and become greatly aggravated when the rapidity or frequency of the air surges of the air stream flowing backwardly over the foil are of frequency nearly the same as the natural period of vibration of the foil or tail portion or other parts, so that when such condition occurs there is great danger of disaster to the ship.

In order to prevent the occurrence and existence of the disturbances to the smooth and even flow of the air stream over the foil surface I so arrange or design the foil itself that the conditions which initiate such disturbances cannot occur, since there is no reason why the air flow should not remain smooth and substantially unruffled over the entire width of the foil (that is, its dimension parallel to the direction of flight) for all velocities, even those greatly above 350 M. P. H., and even greatly above 500 M. P. H., if the disturbances which have heretofore initiated such surges and other unevennesses of air stream flow do not exist. That is, I propose to prevent the formation of the surges and unevennesses of air stream flow by eliminating the conditions which have heretofore been the disturbing factors. While these surges and the like are of tremendous power and destructive ability, and while they very seriously interfere with the lifting ability of the foil, and while they also make necessary a greatly increased driving power in order to move the foil through the air, as compared with that power which would otherwise be needed, still the forces which initiate these surges may be small and quite harmless in themselves; but when such initiating forces are permitted to exist under the conditions heretofore found in airfoils and the like, the surges are brought into existence and their power and destructive effect is then tremendously augmented by the other powers available due to the flight of the foil. I therefore seek to so design and arrange the foil or other part that the initiating disturbances will not exist or occur, and as a result the smooth and undisturbed flow of the air stream will continue even when the foil velocities are pushed to such high points as 500 to 600 M. P. H. Under these conditions, also, the power required to maintain flight at such velocities will be greatly reduced as compared with the power which would otherwise be required, with corresponding tremendous savings in cost of operation, reduction of power plant size with corresponding reduction of first cost, reduction of fuel consumption per mile of flight, with corresponding reduction of fuel load for a given length of trip, and corresponding increase of pay load, etc.

The disastrous effect of relatively minor initiating disturbances on the flow of the air stream over the foil surfaces, especially when such initiating disturbance occurs adjacent to the leading edge of the foil will be apparent when it is considered that the air stream must spread rapidly with the increasing thickness of the foil, and thereafter return as the thinner portions of the foil move past a given point, so that the air of the stream is subjected to very rapid changes of direction of movement, and must be correspondingly accelerated and decelerated with almost lightning-like rapidity.

If we consider air wave disturbances moving towards the leading edge portion of the foil, such as sound waves, or such as the disturbances occasioned by the passage of the propeller blades past a given point with respect to the foil, such disturbances will be propagated in all directions from their points of generation, and will travel with the velocity of sound in air. Such disturbances will strike the foil surface, among other things; and reflections of such waves will occur from such surfaces. If these reflections from the foil surface occur under the proper conditions such that the reflected waves move out directly against new incoming waves, and if the frequency of the new incoming waves is not the same as that of the reflected waves, there will occur "beats," due to the non-synchronous conditions so created; and the frequency of these beats will depend on the disparity between the incoming and outgoing frequencies. This is known as the "Doppler effect." These beats will be of a very much lesser frequency than the frequency of the initial or oncoming waves, and also will be of greatly aggravated amount. That is, these beats will possess much greater power than the initial waves from which they arise, and such greatly increased power will be represented by a greatly increased densation and rarefaction of the air during the beats themselves. Such greatly increased densation and rarefaction of the air due to these beats will possess a disturbing power and influence far greater than the densations and rarefactions of the air in the original or initiating waves themselves.

The densations and rarefactions of the air caused by or representing these beats will cause disturbances in the air stream flowing backwardly over the foil surface from the location where such beats occur, and these disturbances will appear as waves in the air stream itself, since manifestly the expansion and contraction of the body of air of the stream, as represented by such rarefactions and densations can only, and must, appear as a disturbance to the smoothness of flow of such air stream. Furthermore, if the frequency of such beats and disturbances is relatively slow, for example of the order of fifteen to thirty per second, it is apparent that very long air waves will be produced, depending of course on the actual velocity of travel of the foil through the air body itself.

Now, the existence of such beats will depend on the manner and direction in which the reflected waves move away from the foil surface as compared with the original waves, so we must at the outset consider how, and under what conditions the oncoming waves will meet the foil at different portions of the foil surface, and the manner, if at all, in which such waves will be reflected from the foil surface at different locations thereof. In this connection it is remembered that the foil itself is generally of a rounded or curved form, and that it is travelling through the air body, so all these factors must be considered in determining how, and where and in what manner these initiating disturbances may be either wholly eliminated at all points, or their effects may be neutralized so that the backwardly flowing air stream will not be disturbed thereby.

As will presently appear hereinafter, for any given velocity of travel of the foil through the air, oncoming waves of disturbance must meet the foil surface normal thereto at a definite location on the curve of the leading edge portion of the foil, in order that the reflections of such waves may be reflected outwardly from the foil surface normal thereto, and therefore directly back against other oncoming waves. Such normally reflected waves are the most important ones to consider in the present analysis, since they are the ones, as will presently appear, which are most powerful to create beats capable of initiating the disturbances in the air stream. Oncoming waves which strike the foil surface at other locations are not capable of being reflected outwardly from the foil normal thereto and directly against such other oncoming waves, and therefore such other waves do not create beats comparable in power with those of such first mentioned oncoming waves.

The result of the above stated condition is that for any specified foil velocity there is a "critical angle" at which the oncoming waves may strike the foil surface and be reflected outwardly from such foil surface directly back against the oncoming waves; so that serious beats are produced thereby; and the location on the foil's curved surface where such oncoming and reflected waves travel in a direction normal to the foil surface is that line along the foil where its surface lies normal to the direction of incidence of such oncoming waves. For example, as will presently appear, the critical angle of incidence and reflection of the waves for a velocity of 500 M. P. H. is 71 degrees with respect to the direction of travel of the foil body, that is, 71 degrees either upward or downward, and slanting forwardly; and the location on the curvature of the leading edge of the foil where such normal incidence and reflection can occur is that location where the foil surface lies at an angle of ninety degrees with respect to such 71 degree angle, that is, where a plane lying at an angle of 19 degrees with respect to the direction of foil flight will come tangent to the curvature of the leading edge of the foil surface.

Such line of tangency to the curve of the foil surface at any point may be designated as the slope. It will be positive at all locations in advance of the position where said slope becomes zero, being parallel to the mean chord line of the foil. Said slope may be measured as the angle between said line of tangency and the mean chord line. Of course, for any other specified velocity of foil travel the critical angle will be other than 71 degrees, and I have hereinafter shown by a suitable curve the relationship of such critical angle for all foil velocities between zero and 720 M. P. H. I have also disclosed the manner in which such critical angle for any given foil velocity may be determined, depending on the velocity of travel of sound in air.

Now the velocity of sound in air depends upon the temperature of the air, but not on its pressure, and such velocity is generally stated to be approximately 1089 ft./sec. at 0 degrees C. Lowering of temperature results in lowering of wave velocity in the air, whereas raising of temperature results in increase of velocity of the waves; so that, for example, for 67 degrees above zero F. the velocity is approximately 1212 ft./sec., whereas for 3 degrees above zero F. the velocity is approximately 966 ft./sec., being approximately 1089 ft./sec. at zero C., or 32 degrees F. Such variation of velocity of waves in air with change of temperature results in corresponding change of the critical angle for any selected foil velocity; but as will presently appear it is necessary in any case to make provision for a given range of foil velocities, and to provide the features of the present invention in such form as to cover a practical range of foil velocities, and in so doing it is also possible to make provision for a practical range of temperature conditions, so that proper and desired compensation will be ensured for both the desired range of velocities and temperatures. Still, due to the fact that the velocity of the waves in air does not change with change of pressure (within practical limits), it is not necessary to make provision for changes of altitude at which the foils will operate, and such foils embodying the features of my present invention may be operated with equal advantage at all practical altitudes from sea-level to stratosphere conditions.

Considering again the creation of the beats due to interference between the oncoming and reflected waves along the critical angle (for the selected velocity of foil travel), the frequency of such beats will depend on the frequency of the original disturbances as compared with the frequency of the reflected waves reflected out and back along the line of the critical angle; but the frequency of such reflected waves will depend on the velocity at which the foil surface at the position of impact of the waves is travelling against the oncoming waves. That is, considering the conditions existing along the line of the critical angle, the surface of the foil at the location normal to such angle, is moving upwards and against waves arriving on such critical angle, with a velocity depending on both the forward velocity of the foil and the angle of such foil surface at such location. Thus, in the case of 500 M. P. H., for which the critical angle is 71 degrees with respect to the direction of foil travel, the movement of the foil surface directly against the line of such angle is equal to the actual velocity of the foil in its direction of travel, multiplied by the co-sine of the angle of such line with respect to the direction of foil travel. Since, as will presently appear, the critical angle increases with velocity of travel of the foil, the co-sine of such angle decreases from unity for zero foil velocity, to zero for a foil velocity equal to the velocity of sound in air, and therefore the product of foil velocity multiplied by such co-sine will increase from zero to some maximum amount, and then again fall to zero for foil velocities equal to the velocity of sound in air. It is found by my present invention that such maximum condition occurs at approximately 360 M. P. H., and therefore the maximum frequency of the beats produced by interference of the reflected and oncoming waves occurs for such velocity of approximately 360 M. P. H. for the foil in the direction of its flight. It is also found that under these conditions the frequency of these beats is approximately one-fourth the frequency of the oncoming waves or disturbances which are being reflected at such velocity and location. For example, in the case of a propeller with three blades, rotating at 2000 R. P. M., the propeller waves or impulses would come at a frequency of 6000 per minute, or 100 per second; and the beats would therefore be of a frequency of approximately 25 per second. This is by way of example, and for the condition of approximately 360 M. P. H. foil velocity, and along the critical angle of 58 degrees (see curves).

Now, as will presently appear these beats represent serious alternate densations and rarefactions of the air, and they occur near the surface of the leading edge portion of the foil where the air stream is flowing backwardly over said surface at a velocity dependant, among other things, on the velocity of flight. The length of the surges which will be set up in the air stream flowing backwardly over the foil surface will depend therefore on the air velocity in comparison to the frequency of such beats. It is found, as will presently appear, that for a given assumed condition a curve may be plotted showing the relationship of such surge lengths as compared to foil flight velocity, and such curve is disclosed hereinafter. This curve shows very clearly that not only does the frequency of the beats reach a maximum at approximately 360 M. P. H. velocity of foil flight, but also at approximately such velocity the lengths of the said air surges begin to increase very rapidly, thus bringing about the condition that a great increase of the power and destructive effect of such surges will ensue for such velocities above approximately 360 M. P. H., and at velocities of approximately 500 M. P. H. this curve shows that such surge lengths have increased to approximately double their length for 300 M. P. H., and approximately fifty percent greater than for a velocity of 360 M. P. H. Furthermore, for a foil flight velocity of approximately 600 M. P. H. these surge lengths are approximately fifty percent greater than for 500 M. P. H.

Now, in addition to the reflection of waves directly back along the line of the critical angle for any given velocity of foil flight, thereby causing the generation of the beats heretofore explained, it is also to be noted that waves may be reflected directly forward from the exact nose of the foil, at that location where such surface is normal to the direction of flight, and such "nose" waves may be reflected at any and all velocities of foil flight. However, due to the air conditions existing at the nose proper, there is practically no possibility of any beats which might otherwise be created at that location seriously affecting the air flow backwardly over the foil surface, since at the very nose the air is being subjected to a special condition, not exactly susceptible of analysis, with certainty.

Nevertheless, I have made such analysis, and it is found that the length of surges which would be generated by reflections from the exact nose, does not change with velocity of foil flight, but remains constant for all velocities of foil flight, and the only factor affecting such surge lengths is the frequency of the original disturbances, assumed in the present case to be the movements of the propeller blades. I have hereinafter disclosed curves showing the analysis of these "nose" surges.

It is here noted that the frequency of the "nose" surges is double that of the surges produced at the "critical angle" for the velocity of approximately 360 M. P. H., foil flight, and is treble that of surges produced at the "critical angle" for the velocity of approximately 490 M. P. H., and is quadruple that of surges produced at the "critical angle" for the velocity of approximately 560 M. P. H., etc. Now, in case of any noticeable effect of these "nose" surges on the flow of the air stream over the foil surface, it is manifest that such effect will be a maximum at those locations where the frequency of such "nose surges" is a direct function of the frequency of the surges produced at the critical angle for the velocity of flight in question, since under these conditions there will be produced what I may call supplemental beats of increased power and destructiveness. It is here noted that such conditions will occur, if at all, for the velocity where it has been noticed that a great increase of power is necessary to maintain flight, namely, about 360 M. P. H., and also at the higher velocities of approximately 490 and 560 M. P. H.

Since the initiation of the disturbances which appear as surges or other unevennesses in the flow of the air stream over the foil surface is due to the reflection of incoming waves by the foil surface at the line of incidence of the critical angle (or approximately thereat), and since, as I shall hereinafter disclose, such reflections along such line can only occur at that portion of the foil surface which is normal to such critical line (or approximately thereat), I propose to so form the foil surface as to eliminate any portion thereof which lies normal to such critical angle for the intended velocity of flight for which such foil is intended, and to eliminate from the foil surface such portions lying to the adjacency thereof as may be necessary to provide a suitable range of velocities of foil flight both above and below such normal intended velocity, so that reasonable operating conditions will be possible without encountering the creation of the undesirable initial beats; or I propose to so form the foil surface that such incoming waves cannot be reflected therefrom at and adjacent to the line of the critical angle as aforesaid, such prevention of reflection being accomplished in suitable manner or manners, as for example by neutralization of effects of incoming waves so that such waves cannot be reflected, etc. The means whereby such results are accomplished herein will be presently disclosed. At this point, however, I point out that satisfactory operation of the foil, especially at such great velocities as herein contemplated, requires that the surface of the foil be substantially free of violent or unnatural changes of contour or surface, as these in themselves tend to interfere with the smooth and regular flow of the air stream; so it is a further feature and object of the present invention to so form the foil surface that no such violent or undesirable changes in surface contour shall be created, and still the desired operating conditions and results herein set forth shall be secured.

In connection with the elimination of reflections of the incoming waves by neutralization, such result may be secured, for example, by generating at the surface of the foil where such incoming waves are normal thereto at the critical angle, pulses of the same frequency as the frequencies to be neutralized, such pulses being of type opposite to the incoming waves, or of type to receive and destroy such incoming waves. In this connection, it is noted that when using a three blade propeller the waves of initial disturbance created by the passage of the blades past the top portion of the foil are generated alternately with respect to the waves of initial disturbance created by the passage of the blades past the bottom portion of the foil. That is, the incoming waves from the propeller blades strike the foil surfaces top and bottom in alternation instead of simultaneously. Thus the reflections of these waves occur in alternation, although such reflections are outwardly against the respective incoming sets of waves. I propose, as one means to neutralize these incoming waves and thereby to prevent the creation of the objectionable beats due to reflections, to provide vents or passages through the body of the foil at and adjacent to the positions of intersection of the critical angle lines normally with the upper and lower foil surfaces, such vents or passages connecting the upper and lower surfaces of the foil together at and adjacent to such locations; so that as incoming waves arrive alternately at the upper and lower foil surfaces along such critical angle lines and normal to the foil surfaces at such locations, they will neutralize each other, a densation of a top surface wave arriving at approximately the same time as a rarefaction of a bottom surface wave; and thereby causing neutralization of the waves, and vice versa. Compensation may also be made for the case of propellers having an even number of blades.

Sometimes, in order to secure correct and complete neutralization as above set forth, it may be desirable to adjust the lengths of the passages or connection between the upper and lower surfaces of the foil; and it is a further object of this feature of my invention to make provision such that the operator or other means may from time to time adjust such connections as to length so that full and complete neutralization will be secured.

In connection with the avoidance or elimination of any surfaces from the foil, either or both top and bottom, upon which the undesirable reflections might occur, I have provided means and arrangements whereby no portion of the surface will occur lying at such an angle to the direction of flight as might be able to reflect such incoming waves normally and at or adjacent to the critical angle corresponding to the intended velocity of foil flight. I have also, in this connection, so arranged these parts that all portions of the foil surface present a smooth and regular contour in the direction of flight, without any sudden or objectionable changes of such surface; whereby the flow of the air stream over such surface is at all times smooth and regular. Nevertheless I have so designed this form of foil surface that the reflections cannot occur at any point where they might tend to be created, due to the intended velocity of foil flight.

In connection with the foregoing I have also so designed and arranged my improved foil surface that the tendency to formation of ice thereon under unfavorable weather conditions, will be well resisted; and I have also, in this connection, made provision for the use of so-called "de-icing" devices, such as alternately inflated and deflated air tubes. In this connection it is a further object of the invention to so arrange these parts that there will not be created any bumps or obstructions or sudden changes of contour of the foil surface such as tend to the formation of ice, especially at and adjacent to the location of the intersection of the critical line with the foil surface for the intended normal operating velocity of the foil, in flight. Thus, it has been noted that there is a tendency for the formation of ice at and adjacent to the critical position just referred to, but by my improved arrangement I eliminate such critical position, and thereby also greatly reduce the tendency to ice formation.

Since any given foil is intended for normal operation at or adjacent to some rather limited range of velocities, it is especially desirable to so arrange the foil surfaces that the reflections of the waves will not occur at such velocities; but I have also, as a further feature of my present invention, as hereinafter disclosed, so designed and arranged my foil surfaces that there cannot occur normal reflections from such surfaces at the critical position for any velocity of foil flight up to and including the very maximum for which it might be intended to operate. For example, in the case of a foil intended for normal operation at and close to velocities of 500 M. P. H., I may design the foil surface so that there will not be any portions thereof capable of reflecting normally, waves arriving normal to any portion of such surface for conditions of flight up to and including 600 M. P. H. By this means I provide assurance that while accelerating up to the normal intended velocity of 500 M. P. H. the foil will not be subjected to dangerous conditions at, say, 425 M. P. H. or any other speed below 500 M. P. H.; and I also provide assurance that in case of attainment of abnormally higher velocities, as for example, 600 M. P. H. no such dangerous or undesirable conditions will be encountered.

In connection with the improvements in reference to de-icing devices, I provide de-icers which extend across the width of the foil, or across the front or leading edge thereof, as distinguished from de-icers which extend parallel to the length of the foil; and in some cases my improved de-icers also constitute a portion of the means for avoiding or eliminating any "critical" portion of the foil surface along the said leading edge portion. By such arrangements I provide de-icers which will not to any extent interfere with the smooth and uniform flow of the air stream backwardly over the foil surface; and also I avoid any tendency to the formation of ice at the location of the "critical" zone, since I have prevented the existence of such "critical" zone in the sense that at no portion of the foil surface can the conditions necessary for disturbing reflections occur or exist.

According to certain embodiments of my invention I avoid the creation of disturbing reflections at and adjacent to the "critical angle" for the intended speed of operation, by withdrawing air from the foil surface at and adjacent to the "critical zone" or zone of disturbance where the disturbances are originally generated (in the absence of provision for avoiding the same). By withdrawing such air from such zone I prevent any generation of reflections such as cause the intense beats previously mentioned. In some cases, and as a special or specific embodiment of my invention, I provide means to draw air for the motors through suitable openings or slits located along the upper and/or lower foil surfaces at the position of such "zone of disturbance," thereby providing for elimination of the possibility of such reflections, and at the same time ensuring such withdrawal of air directly to the motor or motors, and in volume substantially proportional to the velocity of foil flight, or proportional to developed engine power needed to maintain flight. This arrangement also makes it unnecessary to make other provision for disposal of such air, when using this embodiment of the invention.

According to other embodiments of the features of my invention I avoid the generation of the disturbances at and adjacent to the "critical zone" by providing the foil surface in such location of a material which will not effectively reflect the disturbing waves so that the beats will not be formed. Such material may, for example, be of either a slightly soft or other non-reflecting nature, or may be otherwise specially treated or of a special nature so that its ability to reflect such waves is destroyed or greatly reduced.

A further object of my invention is to so form and design the foil that it may be readily built by either a moulded process, or may be built up by well known and understood assembly procedure. Thus, for example, various embodiments of my invention lend themselves admirably to manufacture by such moulded wood or wood products processes as ply woods, or specially treated wood sheets, and others which will suggest themselves to the student of this application.

A further feature of my invention relates to improvements in foils generally, including the blades of propellers operating at speeds approximating the velocity of sound in air; and in this connection it is an object to avoid the generation of disturbances in the flow of the air streams over the blades of such propellers, so that a much more efficient and satisfactory operation of such blades will be secured. This object of the invention concerns itself with the application of certain of the features of the present invention to the propeller blades for the above and other purposes.

Other objects and uses of the invention will appear from a detailed description of the same, which consists in the features of construction and combinations of parts hereinafter described and claimed.

In the drawings:

Figure 1 shows a cross-section through a typical foil section, such as the wing of an airplane, showing the direction of flight, and also showing the directions of reflection of waves from the foil surface, normally thereto, at the "critical angles" corresponding to several velocities of flight, including 360 M. P. H., 500 M. P. H. and 652 M. P. H., and also showing the "zone of disturbance" for the 500 M. P. H. velocity condition.

Figure 1ª shows a plan view of a typical airplane having the front or leading edge portions of its foils formed to prevent the existance of the disturbing conditions herein referred to, and according to one embodiment of features of my present invention;

Figure 1ᵇ shows a section through another typical form of wing or foil embodying features of my present invention to avoid the creation of the disturbances herein referred to, and which wing or foil section may be moulded or built up, as hereinafter explained;

Figure 2 shows a fragmentary section through the front or leading edge portion of a typical wing or foil section embodying another embodiment of features of my present invention to avoid the creation of the disturbances herein referred to, and which foil section is provided with non-reflecting surfaces of one form but without change of the contour of the section itself at the location of the "critical zone";

Figure 3 shows a section through the front or leading edge portion of a typical foil section having said leading edge portion provided with transversely extending corrugations or surfaces (extending parallel to the direction of flight), to avoid the possibility of reflection of disturbing waves for all velocities of foil flight up to the maximum intended velocity of the flight in question (and a suitable range greater than such intended normal velocity) said corrugations being formed according to the principles hereinafter explained;

Figure 4 shows a typical section through the corrugations at the nose of the foil, being a section on the line 4—4 of Figure 3, looking in the direction of the arrows;

Figure 5 shows a section on the line 5—5 of Figure 3, looking in the direction of the arrows; being at the 59 degree position, corresponding to a foil velocity of 360 M. P. H;

Figure 6 shows a section on the line 6—6 of Figure 3, looking in the direction of the arrows; being at the 71 degree position, corresponding to a foil velocity of 500 M. P. H;

Figure 7 shows a section on the line 7—7 of Figure 3, looking in the direction of the arrows; being at the 80 degree thirty minutes position, corresponding to a foil velocity of 625 M. P. H;

Figure 8 shows a section on the line 8—8 of Figure 3, looking in the direction of the arrows; being at the 83 degree position, corresponding to a foil velocity of 652 M. P. H;

Figure 9 shows a modified section of corrugations for the nose portion of the foil, being an enlarged detail of a portion of the corrugations shown in Figure 4 to show the details thereof;

Figure 10 shows a typical longitudinal section through a portion of a foil surface and corresponding to Figure 7, but on enlarged scale, and it shows how the corrugations, when used, may be provided with pneumatically operated expanding and contacting tubes or the like, to cause the corrugations to function as de-icers, the corrugations being normally of proper angle to prevent the existence of the disturbing conditions due to velocity of flight and position on the curvature of the foil surface; the section shown in Figure 10 being for a "critical angle" condition of 80 degrees 30 minutes, corresponding to a foil velocity of 625 M. P. H.; but it will be understood that the general foil section and arrangement of Figure 10 might, in some cases be used for the entire or any portion of the lengths of the corrugations, and also that these de-icing corrugations extend parallel to the direction of flight, that is, backwardly over the foil surface.

Figure 11 shows a typical foil section of modified form embodying features of my present invention, to avoid the existence of the objectionable reflecting surfaces herein referred to, and wherein all surfaces of angles with respect to the direction of flight capable of reflecting disturbing waves throughout a range of velocities to both sides (above and below) the normal intended operating velocity of the foil, are eliminated, Figure 12 shows a typical foil section of another modified form embodying features of my present invention, somewhat similar to that of Figure 11, but wherein the elimination of the objectionable reflecting surfaces is accomplished in another manner;

Figure 13 shows still another embodiment of features of my present invention, wherein the curvature of the leading edge portion of the foil may be of suitable design, and wherein the portions of the upper and lower foil surfaces at and adjacent to the "critical position" for the normal intended velocity of flight are provided with suitable openings said upper and lower surface openings being connected together by adjustable passages so that reflecting or disturbing waves arriving at the foil surfaces at such zone may be neutralized or destroyed and their harmful activities thereby be prevented;

Figure 14 shows a fragmentary detailed section through the nose portion of a foil embodying features of my present invention, and including provision for prevention of formation of any "nose" reflections, as hereinafter explained;

Figure 15 shows a face view of a typical propeller blade;

Figure 16 shows diagrammatically and by vector diagram principles the analysis of wave conditions for several velocities of flight, namely, for 360 M. P. H., for 500 M. P. H., and for 652 M. P. H.;

Figure 17 shows the conditions of wave incidence and reflection at the 19 degree foil surface position (corresponding to a "critical angle" of 71 degrees, which in turn corresponds to a flight velocity of 500 M. P. H., by way of illustration), and it shows the manner in which the flight of the foil serves to cause generation of "beats" at this position of reflection, thereby initiating the serious disturbances in the flow of the air stream backwardly over the foil surface;

Figure 18 shows diagrammatically by a fragmentary section such as the section 18—18 of Figure 6, looking in the direction of the arrows, the forward components of velocity of waves of the velocity of sound in air (normal conditions), being at the position of the "critical angle" of 71 degrees, corresponding to a velocity of 500 M. P. H., and it also shows how the forward component of such velocity is modified by the slanting surface of the corrugation against which the reflection occurs;

Figure 19 shows a section on the line 19—19 of Figure 18, looking in the direction of the arrows, and assists in analyzing the modification of the velocity components due to the slanting nature of the corrugation surface;

Figure 20 shows a series of curves plotted primarily against flight velocity in M. P. H., but also including other curves plotted against other factors; and these curves show various relationships between various factors which will be hereinafter analyzed and explained;

Figure 21 shows a plan view of a typical airplane having its wings or foils embodying features of my present invention, and provided with suitable slots or openings along the locations of the "critical zones" for the upper and lower surfaces, and with said slots leading to suitable air passages within the wings, said passages in turn leading to the engine air intakes, so that air is continuously drawn through said slots during flight, thereby avoiding the formation and existance of disturbing conditions at the locations of the "critical zones" already referred to;

Figure 22 is a typical section on the line 22—22 of Figure 21 looking in the direction of the arrows;

Figure 23 shows a cross-section through still another modified form of wing or foil section embodying features of my present invention, and wherein the upper and lower surfaces of the foils at and adjacent to the "critical zones" are provided with slots, said upper and lower surface slots being interconnected so that the disturbances tending to be set up on the upper and lower surfaces at the "critical zones" neutralize each other and harmful effects thereof are avoided; the arrangement shown including a propeller having an odd number of blades, namely, three;

Figure 24 shows a fragmentary section on the line 24—24 of Figure 23, looking in the direction of the arrows;

Figure 25 shows a cross-section through still another modified form of foil embodying features of my present invention, and in which slots in the upper and lower surfaces of the foil at and adjacent to the "critical zones" are interconnected by means of connections of variable length, similar in this respect to the arrangement shown in Figure 13, so that the neutralization of the wave influences on the upper and lower foil sections can be controlled by the pilot, or otherwise, such as automatically in harmony with variations of propeller or engine speed, or changes of temperature.

In order that the features of the present invention may be better understood, and the conditions which should be met and overcome in order to ensure smooth flow of the air streams backwardly over the foil surfaces may be better understood, and in order that certain of the functions and operations of my improvements may be more definitely understood I shall first mention briefly certain analyses of the air flow and wave incidence and reflection conditions with respect to velocity of foil flight. For this purpose reference may be had to Figures 16, 17, 18, 19 and 20. If we consider the disturbance set up in the air at any given point such as 30 in Figure 16, waves of such disturbance will travel outwardly in all directions, with the wave front at all times on the surface of a sphere whose diameter constantly increase; and the radius of such sphere will be increasing with the velocity of sound in air. The surface of such a sphere is shown by the line 31 in Figure 16. Let us assume, for purposes of analysis a sound velocity in air of 1089 ft./sec., being the condition at zero C., or 32 Fah. Let it be further assumed that at the instant of generation of such a disturbance a foil surface stands at the position of the line 32, being 1089 feet back of the point of generation of the disturbance in question. The line 32 does not show the foil surface itself, but illustrates only the distance of the foil surface away from the point of disturbance, measured in the direction of flight. Now the foil surface which we have in mind is a curved surface (being the nose portion of the foil), and we wish to find at what portion of such curved surface the waves of disturbance sent out from the point 30 will strike such foil surface normally thereto, and in such manner that said waves may be reflected by the foil surface at such point, such reflection also being normal to the surface at such point and therefore directly back against the incoming waves from the center of disturbance.

For purposes of this determination let us first assume that the foil is advancing in the direction of its flight with a velocity of 360 M. P. H. This equals a velocity of 528 ft./sec. for the foil, and is opposite to the movement of the disturbing waves coming out from the point 30, as above explained. Therefore, since the foil occupied the position of the line 32 at the instant of generation of the disturbance, the foil will have advanced towards the oncoming wave front a distance equal to 528 feet, assuming that the original distance or location of the foil was 1089 feet back of the center of disturbance, 30. In other words, the foil will advance from the line position 32, 528 feet to the line position 33 to meet the surface of the oncoming wave front at some point. That wave front is on the surface of the sphere, as already mentioned. So, at completion of one second's interval the wave front will stand at the spherical surface 31, and the foil surface which we are inquiring about must meet that surface 31 (one second having elapsed, and the foil having travelled 528 feet at its own velocity), so that the position of meeting of the foil surface with the wave front must be the point where the line 33 meets the surface 31, namely, the point 34 in Figure 16. Now our stipulation was that the foil surface is to meet the wave front normally thereto, or at right angles; and therefore the foil surface which can and will do this must line normal to the line 35 which is the radius extending out from the center of disturbance to meet the surface 31 at the point 34, and therefore the foil surface which can and will meet such so-propagated disturbances normally thereto, when the foil is advancing at the velocity of 360 M. P. H., must be normal to this radius, and is the line 36. Thus it is seen that for the foil velocity of 360 M. P. H., and for a wave velocity in air of 1089 ft./sec., the foil surface which can meet the oncoming waves normally thereto must lie at an angle of such amount, with respect to the direction of foil flight, as to be normal to the radius line 35, and therefore tangent to the spherical surface 31.

Now it will be seen that the angle of this radius line 35 with respect to the direction of foil flight, for the assumed foil velocity of 360 M. P. H., or 528 ft./sec. is readily determined mathematically; and this angle is such that the radius line multiplied by the cosine of this angle is equal to the velocity of sound in air minus the velocity of flight of the foil in its direction of flight. That is, $V \cos A = V - V_f$; where $V$=velocity of sound in air, $A$=the angle which the radius line makes with respect to the direction of foil flight (being herein designated as the "critical angle"), and $V_f$=velocity of foil flight. Knowing the velocity of sound in air for assumed temperature conditions, it is readily possible to calculate the "critical angle" for any selected foil velocity; and it will be noted that for the condition of zero foil velocity $A$=zero; (that is, the "critical angle" is directly in line with the direction of flight); and that for the condition of foil flight at the velocity of sound in air the "critical angle" is ninety degrees, or at right angles to the direction of flight.

In Figure 20 I have plotted the "critical angle" for all foil velocities from zero to 700 M. P. H. (plus), shown by the curve 37. The location of the 500 M. P. H. ordinate has been emphasized for convenience only, since certain illustrations herein given refer particularly to the conditions of 500 M. P. H., by way of illustration. Furthermore, the curve 37 is calculated on the basis of 1089 ft./sec. velocity of sound in air.

Referring again to Figure 16, I have therein also shown the radius line 38 and the tangent surface line 39 corresponding thereto, for the condition of 500 M. P. H, or 733 ft./sec., foil velocity; and the radius line 40 and the tangent surface line 41 corresponding thereto, for the condition of 652 M. P. H., or 955 ft./sec., foil velocity. The critical angles for these velocities are, respectively, 59 degrees for 360 M. P. H., 71 degrees for 500 M. P. H., and 83 degrees for 652 M. P. H., and for any other selected velocity of flight the critical angle may either be calculated or determined by reference to the curve 37 of Figure 20.

Referring to Figure 1 I have therein shown by the lines 42, 43 and 44 the critical angles for the three illustrative velocities above mentioned; and I have also on that figure shown the locations on the curve of the leading edge or nose portion of the foil where the lines come normal to the curve of the foil surface. It is evident that as the velocity of flight increases the line of the critical angle corresponding thereto shifts backwardly over the curve of the surface, being normal to the surface at the point of intersection therewith.

Further study of Figure 16 will make it evident that the following relationship exists for the conditions of any selected velocity of flight: For a given velocity, for example 500 M. P. H., there is a "critical angle" (71 degrees for that velocity), and waves travelling towards the foil surface along said critical angle line arriving against that portion of the curved foil surface which is normal or right angles to such critical angle may be reflected by the foil surface directly out again in the direction of said critical angle line; so that the incident and reflected waves on the critical angle line for the velocity at which the foil is travelling may be directly reflected back the way they came, and in direct opposition to newly arriving waves along the same line. Since there is a critical angle for each velocity, and since the foil surface is curved it follows that for any selected velocity of flight there is one location or zone on the curve of the foil surface where this direct reflection condition may exist, and that zone is at the location where such critical angle line intersects the surface normal thereto. This will hereinafter be shown to be a "zone of disturbance."

Thus far we have considered the case of waves arriving along the line of the critical angle for the foil velocity in question, and striking the foil surface at such point on its curve as to arrive normal thereto on such critical angle line, so that said waves may be and are reflected directly back along the same line. We next explore the conditions existing as respects waves arriving along other directions, either less than or greater than the critical angle for the foil velocity in question. We consider, by way of illustration only, the foil velocity of 500 M. P. H. The critical angle has been shown to be 71 degrees, and is shown by the line 38 of Figure 16, or 43 of Figure 1. It intersects the curved foil surface at the point 45 (Figure 16), and the line 39 is normal thereto at said point. If we next consider the case of waves arriving towards the foil along a line at 59 degrees to the direction of flight, such as the line 35 (Figure 16) corresponding to the critical angle of 360 M. P. H., such waves, if originating at the point of disturbance 30, would have to strike the foil surface (after the lapse of 1 second, corresponding to 1089 feet travel), at a point 34; but that point is above the location of the point 45, and the curvature of the foil surface is such that a point where said surface of the foil lies at an angle of 31 degrees to the direction of flight (90—59), is below the point 45, not above it; so waves originating at the center of disturbance 30, could not possibly arrive simultaneously against the curved foil surface, normal thereto along the 59 degree line 35, from the same center of disturbance 30 whence arrived the waves along the critical line 38 for the foil velocity in question.

Likewise if we consider the case of waves arriving towards the foil along a line at 83 degrees to the direction of flight, such as the line 40 (Figure 16) corresponding to the critical angle of 652 M. P. H., such waves, if originating at the point of disturbance 30, would have to strike the foil surface (after the lapse of 1 second, corresponding to 1089 feet travel), at a point 46; but that point is below the location of the point 45, and the curvature of the foil surface is such that a point where said surface of the foil lies at an angle of 7 degrees to the direction of flight (90—83), is above the point 45, not below it; so waves originating at the center of disturbance 30, could not possibly arrive simultaneously against the curved foil surface, normal thereto along the 83 degree line 40, from the same center of disturbance 30 whence arrived the waves along the critical line 38 for the foil velocity in question.

The above clearly shows that disturbances originating at a given center (such as 30, Figure 16), cannot strike the curved foil surface normal thereto at more than one angle of arrival, and therefore, if that center of disturbance is such that said disturbing waves may arrive along the critical angle line and strike the surface normal thereto at a given point, the waves from that center cannot strike other portions of the foil along other angles of arrival, and arrive normal to the foil surface at the arriving points. Still it is clear that other waves, from other centers of disturbance might arrive against the foil surface in such directions as the lines 35 and 40, corresponding to 59 degrees and 83 degrees, respectively, and for this reason we must explore the conditions of arrival of such other waves.

If we again assume the velocity of flight as 500 M. P. H., or 733 ft./sec., so that the critical angle is 71 degrees, shown by the line 38 (Figure 16) we may explore the conditions with respect to waves arriving along the lines 35 (59 degree) and 40 (83 degree), or along lines parallel thereto. Take, first, the case of waves arriving along the 59 degree line 35, or parallel thereto; and assume that they strike the foil surface at such point on the curve thereof as to arrive normal to such surface (being the point 47 of Figure 1). A corresponding point of arrival is shown at 34 in Figure 16. Due to the fact that the angularity of arrival of such waves, with respect to the direction of flight, is greater than the angularity of the 500 M. P. H. line 38, it follows that the cosine of such line angle (35) is greater than the cosine of the 500 M. P. H. line angle (38), and therefore the component of travel of these waves of the line 35 directly against the direction of foil flight is greater than the component of travel of the waves arriving along the line 38 (being the 500 M. P. H. critical line, and we are assuming an actual foil velocity of 500 M. P. H., by way of exploration); and such fact is diagrammatically shown in Figure 16. Assuming that we consider the factors such that one second is consumed during the travel of the disturbing waves from the center 30 to the foil surface (as in previous analyses herein), we find that the foil surface has advanced 733 feet (500 M. P. H.), and that the component of travel of these 59 degree line waves directly against the direction of foil travel is 561 feet (see Figure 16). But the foil has actually travelled 733 feet during 1 second at 500 M. P. H., leaving only 356 feet which the waves from the center 30 might have travelled against the direction of the foil, or an excess of 205 feet. This means that the center of disturbance from which these waves coming over the 59 degree line reached the surface of the foil normal thereto must have been 205 feet in advance of the center of disturbance from which the waves arriving along the 71 degree line came; or else that the waves arriving along the 59 degree line were generated later than the waves arriving along the 71 degree line.

Now actually the disturbances setting these waves in motion or generating them are due to such instrumentalities as the propellers, engine exhausts, etc., generally carried by the plane itself; and it therefore follows that the waves coming along the 59 degree line 35 originated at substantially the same time and substantially the same distance in advance of the curved foil surface as the waves coming in along the critical angle line 38, for the foil velocity in question (500 M. P. H.). The propeller blades cover a wide surface of travel, and disturbances therefrom coming along the 71 degree or critical line (for 500 M. P. H.) may occur simultaneously with disturbances from said blades coming along the 59 degree line or other lines, to the foil surface.

Now if any reflections can occur from the curved foil surface at the point thereon where the 59 degree line intersects such surface normal thereto, the flight of the foil still being at a velocity of 500 M. P. H., or 733 ft./sec., the so reflected waves will move away from the foil surface at the velocity of 1089 ft./sec., and at any given instant the wave front will be represented by the surface of a sphere. Therefore, drawing the circle 48 in Figure 16 from the center 34, and with a radius of 1089 feet, such reflection wave, if any, will have its front somewhere on that circle after the lapse of 1 second's time. Waves travelling on the 59 degree line will have a component of travel in the direction of foil flight of 561 feet during one second, taking into account the cosine of the 59 degree angle; but the foil is itself travelling in the direction of its flight at the velocity of 733 ft./sec., corresponding to 500 M. P. H., leaving a difference of only 356 feet which the wave might have advanced beyond the foil location at the end of one second's time (being 1089—733), so there appears an excess of 205 feet in the above computation (being 561—356). This excess distance must be accounted for in some manner, and it is due to the fact that the reflected wave from the 59 degree location on the foil surface is not reflected from such point on the surface normal thereto, but is reflected backwardly in some direction from the surface of reflection at an angle other than the angle of incidence, the incidence having been assumed to be normal to the surface at such 59 degree position.

We now wish to ascertain the angle at which such reflected wave from the 59 degree location travels out from the foil surface, having arrived normal to such surface at such 59 degree location. Reference to Figure 16 again shows that the angle of reflection of such wave (such reflected wave being shown by the line 49) may be determined in the following manner; if C is the angle of such reflection with respect to the direction of foil flight, then we find that $$1089 \cos C = E + (1089 - V) - E$$

or, in other words, the cosine of C is equal to the cosine of angle A (the critical angle for the velocity of foil flight in question), so that the angle of reflection of such assumed wave arriving normal to the foil at the 59 degree line is equal to the critical angle for the velocity being considered, namely, 71 degrees. In the above equation, E equals the excess distance previously explained. The above relationship will be evident from examination of Figure 16. Therefore the line of reflection of such 59 degree incident wave will be as shown by the line 49 of Figure 16, parallel to the line 38 for the incidence and reflection of waves arriving normal to the foil surface at the proper location for the velocity of flight in question, namely 500 M. P. H.

Likewise it will be found that for the condition of waves arriving normal to the foil surface at other locations where such waves arrive at angles greater than the critical angle for the velocity in question, namely, at angles greater than 71 degrees, the excess velocity will be of a negative character, or minus instead of plus. For example, waves arriving along the 83 degree line 40 of Figure 16 will be reflected out along the line 50 of said figure which line is also 71 degrees to the direction of flight, notwithstanding that said waves arrived normal to the foil surface at the point of incidence, and along a line of 83 degrees with respect to the direction of flight.

The above apparent anomaly is explained by the fact that the components of velocity of such specially considered waves measured in the direction of foil flight are not equal to 1089 minus the actual foil velocity, so that such waves arriving against the foil surface normal thereto, but at locations other than the location of the "critical zone" do not have components of velocity directly against the foil flight of amount equal to the velocity of sound minus the velocity of such flight; but in the case of waves arriving at angles greater than the critical angle (71 degrees for the case of 500 M. P. H.) there is an excess of such component, and in the case of waves arriving at angles less than the critical angle there is a deficiency of such component. Waves of the first mentioned category are rolled over towards the 71 degree line, and waves of the second mentioned category are rolled over also towards the 71 degree line, for the assumed condition of 500 M. P. H. flight velocity; and all waves are reflected out from the foil parallel to each other and in the direction of the critical angle for such velocity of flight. We are, of course, considering the case of either the top or bottom face of the foil, as the case may be.

Naturally these reflections due to waves arriving at other than the critical angle are of much less strength than the reflections of the true waves arriving along the critical angle line, and being reflected directly back along that line, so that the greatest portion of the disturbances presently to be considered are due to the truly reflected waves along the line of the critical angle, but we are demonstrating that the direction of all reflected waves from all portions of the curve of the foil surface is the critical angle for the velocity in question, which critical angle is the one to be definitely considered herein for correction purposes in order to avoid and prevent or neutralize or destroy the greatly harmful effects of such critical angle conditions.

We next consider the nature of the waves which are reflected back along the line or direction of the critical angle for the velocity in question. For this purpose we shall assume a given frequency of the arriving waves, that is, the frequency of their generation by the disturbing element. Such disturbing element may be, for example, a propeller in advance of the leading edge portion of the foil. Assume the case of a three blade propeller turning over at 2000 R. P. M. The blades will pass a given point at a frequency of 6000 per minute, thereby setting up disturbances of violent nature at that frequency. The waves of disturbance may therefore be assumed to be of frequency of 6000 per minute. These are arriving along the line 38 of Figure 16, or 43 of Figure 1. They are of frequency of 100 per second. Manifestly this frequency is taken merely by way of illustration to show the principles here being considered.

In Figure 17 I have shown diagrammatically the conditions existing along the 71 degree line, and at the foil surface where such line intersects such surface normal thereto, being for the 500 M. P. H. condition. This is the line 51. The line 52 lies normal thereto, or at 19 degrees to the direction of flight, and represents the angle of the foil surface at the location in question. Incident waves of the frequency of 100 per sec. are shown by the full line 53, and this curve 53 may be of characteristic wave form, depending on the form of the incident waves. The point of incidence is shown at 54. Now the surface of the foil is advancing directly towards such incident waves, due to the fact that such surface lies at an angle or tilt with respect to the direction of flight, and the rate of such approach towards the incoming or incident waves will depend on the actual velocity of flight in the direction of such flight, and also the sine of the angle which the foil surface makes with the direction of flight, at the point in question on the foil surface. For the case of zero foil velocity the sine of such angle is unity, the critical angle being zero and the foil surface lying at ninety degrees to the direction of flight, and for the case of flight at the velocity of sound in air the critical angle is ninety degrees and the foil surface lying parallel to the direction of flight. For the case of zero velocity, therefore, the product of the factors is zero, and this is also true for the case of flight at the velocity of sound in air; but for intermediate velocities this product depends on the foil velocity, rising to a maximum, and then again falling to zero. In Figure 20 I have shown, by the curve 55 the values of this component of foil velocity directly against the direction of incoming waves arriving along lines lying at the critical angles for foil velocities from zero to 720 M. P. H. It will be seen from examination of this curve 55 that the actual value of this component rises to substantially 275 ft./sec. for the condition of flight at substantially 360 M. P. H., and then this component again falls to zero.

Now, due to the fact that this foil surface is moving towards the incoming waves which are arriving along the critical line, the frequency of impact of these waves against the foil surface, and therefore the frequency of reflections, will be increased by the ratio of the counter velocity divided into the velocity of the waves in air, assumed as 1089 ft./sec. I have computed this ratio for various velocities of foil flight, and have shown such ratios by the line or curve 56 in Figure 20 for velocities between zero (or slightly more), and 700 M. P. H. foil flight. This curve is designated as $R_c$. It is seen to fall from a high value for low foil velocities, to approximately 4.00 for foil velocities of substantially 360 M. P. H., again rising to high values for high foil velocities. It is here noted that this ratio affords a means to compute the frequencies of beats which will be generated by interference of the directly reflected waves with the incoming waves.

Again referring to Figure 17 I have therein shown by means of the curve 57 the reflected waves moving out along the critical line for the condition of 500 M. P. H., or 71 degrees line. The frequency of the waves of this line 57 is greater than the frequency of the incoming waves, so that the points of densation and rarefaction of the incoming and outgoing or reflected waves come alternately in opposition and cumulation, thereby causing the formation of the resultant wave form shown by the curve 58. It will be noted that this curve 58 builds up from very slight peak values to much greater peak values, the maximum conditions being shown substantially at the points 59 for densations, and 60 for rarefactions; and the maximum or beat condition occurs substantially at the position of the line 61. Thus, for the conditions existing, namely, different frequencies of incident and reflected waves, we produce the condition of violent beats; and these beats come at a much less frequency than the frequency of the incident waves. Furthermore, the violence of the densations and rarefactions of these beats is substantially double that of the generating waves themselves, so that a slow but violent disturbance is created in the air stream flowing backwardly over the foil surface.

Now, knowing the velocity of flight and the frequency of the beats produced as above explained, we are able to compute the approximate lengths of the air waves or surges which will occur in the air stream flowing backwardly over the foil surface, and this I have done. The curve 62 of Figure 20 shows the lengths of these air surges or violent waves which are generated or initiated by the beats above explained, plotted against foil flight velocities in M. P. H. It will be seen that these air stream surges increase from substantially 12 feet in length for velocities of 60 M. P. H., to substantially 95 feet for velocities of 700 M. P. H.; and also that for the foil velocity condition of 360 M. P. H., these air stream surges have lengths of substantially 23 feet. Incidentally a curve might be plotted showing the relationship of frequency of these beats, and therefore frequency of these air stream surges per minute or per second, plotted against foil flight velocity in M. P. H., but I have not plotted such curve because of the crowded condition of Figure 20; but it is here noted that for the condition of 360 M. P. H. velocity of flight, this frequency is substantially 25 per second for the assumed condition of initial disturbances of frequency of 100 per second, as previously assumed herein.

Now surges of the air stream of the frequencies and lengths herein demonstrated will seriously interfere with the flow of the air stream over the foil surfaces, and furthermore, such surges may become extremely dangerous to the physical structure of the airplane itself. Not only this, but it is noted that the greatest force or effect of such surges may take place where the surges themselves are most violent, namely, near the tail portions of the foils and body of the plane; and such surges may, and have done great damage in some cases. Their existence and strength is far greater than the forces of the initiating waves and beats, since once such surges are brought into existence they grow and increase in power by absorption of energy from the power of the airplane itself, and from the tremendous power existing in the full body of the air stream flowing over the foil surfaces. I propose to substantially avoid the initiation or generation of such disturbances, or to completely prevent or neutralize the conditions which may and do set them into action, by the means and structures and devices which I shall presently explain hereinafter.

At this point I shall consider briefly certain other influences affecting the conditions at the location of the critical angle line for a given velocity of flight. Naturally, the disturbing conditions above discussed exist, not only at the exact location of the critical angle line, but also at locations both in advance and behind such exact location, but in lesser degree. Furthermore, the actual flow of the air stream itself over the foil surface will tend to spread or broaden out the "zone of disturbance" at and adjacent to the critical angle line, so that such factors must be considered in their proper relationship to the problem. The influence of waves arriving normal to the foil and against portions of the curved surface thereof other than at the exact location of the intersection of the critical angle line with such curved surface, has already been considered, and it has been shown that the reflections of such waves are also at the direction of the critical angle, but slightly in advance of or behind the critical angle line. These reflections therefore are of minor importance, and do not materially affect the disturbances on the exact critical angle line. Nevertheless they do increase the net total force serving to generate the disturbances to be avoided, or neutralized.

Now the nose of the foil, that is, the portion thereof where the curve is exactly normal to the direction of flight, can and does reflect waves directly forward for all velocities of flight, so we next consider the effect of such waves. Having done so, by an analysis somewhat similar to that already explained with respect to the other waves, we find that the ratio of frequencies of beats which might be produced by these "nose" waves are as indicated by the curve 63 in Figure 20. Therein it appears that these frequencies commence at a high value for low velocities of flight, and fall to a low value for high velocities of flight, the curve being designated as $R_n$. We also note, from examination of that curve, that this "nose frequency" bears a definite mathematical relationship to the frequencies of the beats generated on the critical lines for certain definite coil flight velocities. Thus, for substantially 360 M. P. H., the $R_n$ is one-half of $R_c$, for 490 M. P. H. this factor is substantially one-third, and for 560 M. P. H. this factor is substantially one-fourth. In other words, the tendency is for the nose beats to exert a magnifying influence, if any, on the critical line beats, for the conditions of 360, 490, and 560 M. P. H.; since double nodes or amplifications are produced; and probably this "nose" influence is greatest for the condition of substantially 360 M. P. H. I have also, in Figure 20, shown by the curve 64 the lengths of the surges which would be generated by these "nose beats" alone, and it is noted that such surges are always of the same length for all foil velocities, namely, substantially 11 feet. We are still assuming that the frequency of the initial disturbances is substantially 100 per second.

Now the travel of the foil through the body of air in which it is in flight necessitates that the body of air be parted in advance of the nose of the foil, generating two streams of air, one flowing over the top foil surface and the other beneath the bottom foil surface. The air so parted by the advancing foil must be accelerated either upwardly or downwardly as the increasing thickness of the foil comes into play, and after the maximum body thickness of the foil has passed this air again moves back. These air movements result in, first an acceleration of the air, for example upwardly, then a deceleration to zero, then an acceleration downwardly, and then a deceleration back to zero. Furthermore, these actions, due to the form of the foil, are such that there is an actual backward movement of the layers of air close to the foil surface during the parting actions. The exact form and nature of the air movements immediately in advance of the foil nose cannot be stated, but nevertheless there is and must be a violent change of air position due to the passage of the foil at high velocity. This uncertainty is further aggravated by reason of the blunt nature of the nose of the foil so that there is built up a body or mass of air directly in advance of the foil nose, and the parting of the air body is largely determined by the form and action of this mass.

In Figure 20 I have shown by the curve 65 the approximate backward velocity of the air close to the surface of the foil, due to the above conditions, at various locations over the curve of the foil, for the assumed foil velocity of 500 M. P. H. This curve is carried forwardly from the 90 degree critical angle position, where such backward velocity is zero, to the 30 degree critical angle position, where such backward velocity of such surface air is substantially 720 ft./sec. The conditions in advance of such 30 degree critical angle position do not need to be examined here. Now since the foil is itself advancing in the direction of its flight, we can establish a velocity factor for such foil surface air in comparison to the velocity which the foil surface is actually travelling at the location of any angle on the foil surface. For example, at the point where the foil surface becomes parallel to the direction of flight this factor is unity, because there the only movement of air over the foil surface is the actual velocity of the foil in its flight; or again at an angle of thirty degrees with respect to the direction of flight such velocity factor is 2.00, for the reason that at such location the foil is shovelling the air upward, at a great rate, thereby causing the surface air to assume a velocity over the foil surface actually greater than the velocity of such foil surface itself. The curve 66 in Figure 20 shows such velocity factor at the different points on the curve of the foil.

Now due to this surface velocity condition of the air stream flowing over the foil surface we find that there is a tendency for the waves of disturbance to be bent backward from the true direction of the critical angle; but the amount of such bending is relatively small and does not materially or substantially remove the disturbances from the true "zone of disturbance" as hereinelsewhere disclosed.

It is also to be noted that as the air str flows up and over the leading edge portion of the foil it suffers certain important and extremely rapid changes of direction, so that the air is subjected to rapid accelerations and decelerations of velocity, of almost lightning-like rapidity. Any such acceleration or deceleration of velocity must be accompanied by forces of compression or expansion exerted on the air stream itself. The exact amount and point of reversal of such forces need not be computed here, but it may be stated that they may approximate as much as two or three, or more pounds per square inch change of pressure due to this action alone.

Furthermore, the location at which the force of compression due to acceleration of the air stream vertically ceases and is immediately followed by a force of expansion of the air of the stream approximates the location of the 50 to 60 degree angle lines—that is, this reversal of kind of force occurs partially up (or down) the height of the foil, and generally within the zone just mentioned.

It has been observed in the past that the power needed to propel the foil rises very rapidly after reaching foil velocities of approximately 360 M. P. H., and that the serious disturbances in the flow of the air stream commence substantially at that velocity of flight. For velocities above substantially 360 M. P. H. the power needed for maintaining uniform flight increases out of all proportion to the increase of velocity; and above substantially that velocity serious surges or air waves are noted, with loss of lifting power, and other serious and dangerous results. Reference to the curves of Figure 20 shows that the maximum point of the curve 55 occurs substantially at the velocity in question; that the low point of the curve 56 occurs substantially at the point and velocity in question; that the ratio of $R_c$ to $R_n$ assumes the value of 2 substantially at the point in question; and that the lengths of the air surges or waves generated in the air stream increase very rapidly substantially at the point in question, with corresponding maximum frequency and increased violence of such surges at that point. It is furthermore noted that this condition corresponds substantially to a critical angle of substantially 59 degrees with respect to the direction of flight. It has also been noted heretofore that for velocities below substantially 360 M. P. H. the flow of the air streams over the surfaces of the foils has been more or less smooth, depending on the smoothness and lack of obstructions in the foil surface. It is now noted that the condition of reversal of velocity force exerted on the air of the stream by reason of acceleration or deceleration of the vertical component of movement thereof also occurs within the general range of velocities above mentioned; so that in fact many forces are cumulatively operative to disturb the smoothness of the flow of the air stream for velocities substantially above 360 M. P. H. Nevertheless, with the exception of the influence of the forces of compression and expansion due to acceleration or deceleration of the air of the stream all of the disturbances may be traced and are due to the existence of the "critical zone" at the position of the "critical angle" for the velocity of flight in operation; and by removing the said critical zone and angle from the foil surface, or by neutralizing or otherwise overcoming the effect thereof, I propose to prevent or extinguish these objectionable and serious results, and make possible the operation of foils at greatly increased velocities of flight, without any of the results previously mentioned herein. Such removal or prevention may be effected either by suitable foil designs completely eliminating the presence of the critical angle portions of the curve (and curves of amount adjacent thereto); or by providing the foil surface at and adjacent to such critical angle positions with a non-reflecting material or finish, such that the waves incident thereon may not be materially reflected back along the lines whence they came; or by providing arrangements whereby the reflections of incident waves may be prevented or neutralized, without need of materially modifying the curve of the leading portion of the foil itself; or by providing means to withdraw from such critical angle portion of the foil, a body or current of air such as to prevent reflection of the objectionable waves from such portion of the foil; or by so interconnecting the critical angle portions of the upper and lower foil surfaces, that the incident waves striking said surfaces will neutralize each other with consequent prevention of the reflections; or by reforming the leading edge portion of the foil in such manner that while said portion retains the curvature or contour which has been selected therefor according to the wishes of the designer, still said surface will not and cannot have, due to such improvements, any ability to reflect the incident waves; or by other means. All said means just above specifically mentioned I have herein illustrated, and will now describe in detail.

Referring first to Figure 1 I have therein shown a cross-section through a typical foil, such as an airplane wing. It is designated in its entirety by the numeral 67. It includes the nose portion 68 and the tail portion 69, and the general contour of the foil illustrated is conventional. I have also shown, for illustration purposes the frame members 70 of this foil. The neutral plane of the foil section is shown by the line 71, and the foil is shown as being slightly tilted in flight so that the angle of attack 72 is established. The direction of flight is shown by the line 73. Also, by way of illustration only, I have shown the "zone of disturbance" 74 as extending outwardly and upwardly at the 500 M. P. H. velocity position (71 degrees with respect to direction of flight), and likewise the "zone of disturbance" 75 as extending outwardly and downwardly at the 500 M. P. H. velocity position from the lower face of the foil. These zones of disturbance are shown as embracing a few degrees both forwardly and backwardly of the exact critical angle lines, for reasons which will be apparent from the discussion heretofore given.

The curve of the nose or leading edge portion of the foil shown in Figure 1 extends backwardly and upwardly for the upper foil surface as shown by the curve 76, and backwardly and downwardly for the lower foil surface as shown by the curve 77, of conventional curvature or design. The critical angle lines for 360 M. P. H., 500 M. P. H., and 652 M. P. H., are shown by the lines 42, 43 and 44, already referred to. It is noted that substantially at the location of the frame member 70 both the upper and lower foil surfaces lie substantially tangent or parallel to the direction of flight, and backwardly thereof the foil surfaces again curve down or up, and towards each other to complete the tail 69.

I propose, according to one embodiment of my invention, to completely eliminate the "critical zone" and "critical angle" portions of the foil surface, and also to do this through a sufficient width or range of the curve of the foil, to make provision for normally expected variations in the normal velocity of foil flight; and it will be understood that I refer to a foil intended for flight at or adjacent to a normally intended velocity of flight. Thus, for example, in the case of a foil intended for flight at a normal velocity of 500 M. P. H., (critical angle of 71 degrees), I prefer to eliminate all portions of curvature of the foil surfaces lying between the critical angles for velocities from, for example, 360 M. P. H., (59 degrees), to, for example, 652 M. P. H., (83 degrees). In other words, according to this embodiment of features of my invention I so form the foil surfaces that they do not contain any portions lying at angles, with respect to the normal direction of flight, between 31 degrees (90—59), and 7 degrees (90—83), the foil surface being so formed that it passes directly from the 31 degree condition to the 7 degree condition (with respect to direction of flight).

Conformably with the above embodiment I modify the upper foil surface so that, commencing at the point 47 (intersection of the 59 degree line 42) said foil surface 79 extends without curve to join a similar surface 80 which is tangent to the curve from the 83 degree point forward to the point 81. That is, the foil surface passes directly from the 31 degree condition to the 7 degree condition, either by suitable connecting plane portions as shown in Figure 1, or without such plane portions; but in any case I thereby completely eliminate the portions lying between the angles of 31 and 7 degrees with respect to the direction of flight (corresponding to the 59 and 83 degrees critical angles aforesaid. Manifestly, in the case of a foil intended for flight at some other normal, but high velocity, than 500 M. P. H., and in the case of a selection of some other range of possible operating velocities than the range between 360 and 652 M. P. H., the portions of foil surface appropriate to such other normal operating velocity and range of velocities would be eliminated, and the foil surface would pass directly between the appropriate angles with respect to the direction of flight.

It is noted that in the foregoing case the modification of foil surface has been effected by slight widening or thickening out of a portion of the leading edge portion of the foil.

It is to be noted that in the arrangements just above explained there are provided abrupt or sudden changes in the contour of the foil surface. Sometimes it will be desirable to avoid or neutralize the reflections without such sudden or abrupt changes of foil contour. For example, in the arrangement of Figure 2 I have shown a typical foil section, of regular and conventional curvature; but in this case I have provided, in the upper and lower foil surfaces, portions thereof which are of non-reflecting nature, located throughout the proper zone of curvatures, so that waves incident to such portions of the curved surfaces will not be reflected, and the objectionable reflections will thereby be prevented. These are the sections 86 and 87 set into, or constituting portions of the upper and lower foil surfaces. Each of these sections embraces a portion of the foil curvature between, for example, the 31 degree position and the 7 degree position, (with respect to the direction of flight), corresponding to the 59 and 83 degree critical angle conditions now being assumed.

The non-reflecting surfaces 86 and 87 may be of suitable material, such as soft rubber or sponge rubber, or cellulose material such as sound-deadening materials widely used for the ceilings or other enclosures of rooms and the like, or many other suitable sound-deadening materials may be used. Generally it may be stated that these surfaces 86 and 87 should not have highly polished surfaces, as the polish in itself frequently renders such surfaces sound-reflecting, notwithstanding their relatively soft nature. For example, in the case of use of soft rubber for these portions, such as sponge rubber, the same may be left in its spongy condition on the exposed surface. Material generally known under the name of Celotex may also be used for these surfaces 86 and 87. These surfaces need not be of great thickness, but only thick enough to provide a sound-deadening non-reflecting action; and a thickness of a fraction of an inch will generally be sufficient. Sometimes they may be established by suitable treatment of the exposed surface of a foil of conventional contour, without need of material change of the structure thereof, and merely by application of a suitable finish to such surface throughout the range of angles necessary with respect to the direction of flight.

In Figure 11 I have shown another foil section embodying features of my invention, and in which the contour of the foil has been modified to eliminate the surfaces of non-desired angle with respect to the direction of flight, for the intended normal velocity of flight, and selected ranges both above and below such velocity. The section shown in Figure 11 is similar to that of Figure 1, with the exception that the flat or plane portions adjacent to the 31 degree and 7 degree portions of the foil curve have been left out, and the curve of the foil passes directly from the 31 degree condition (59 degree critical angle) to the 7 degree condition (83 degree critical angle).

In Figure 12 I have shown still another embodiment of features of my present invention. In this case the curve of the nose portion terminates at the 31 degree position with respect to direction of flight (59 degree critical angle); and also the normal foil curve recommences at the 7 degree position (83 degree critical angle). Between these two portions of curve there is placed a short section 88 facing upwardly and backwardly at such an angle that waves striking such surface at the 71 degree direction, for example, will be reflected directly backwards in a direction parallel to the surface of the foil immediately behind such reflecting surface. In this case any waves reaching the surface along the critical line of 71 degrees will thus be reflected backwardly parallel to the surface of the foil, and will tend to be swept back with the backwardly flowing air stream, thus further preventing possibility of objectionable reflections.

In the arrangement of Figure 14 I have shown the front or nose fragment 89 of a typical foil section, but modified in such manner that there is no portion which is directly normal to the direction of flight. This arrangement will prevent the formation of any nose waves; and this feature will be of applicability to any or all of the various embodiments hereinelsewhere disclosed.

Now the several embodiments thus far disclosed are such that the reflections are avoided by physical reformation of the foil surface at and adjacent to the location of the critical angle for the intended velocity of flight (with the exception of the form of Figure 2). I shall disclose certain embodiments of my invention by means of which such reflections are prevented or avoided by other means, while still making it possible to design the curve of the foil along conventional lines, or of curvatures which are desirable from other standpoints.

Now it has been shown that for any selected normal intended velocity of flight operation, for example, 500 M. P. H., there is a critical angle along which disturbing waves must arrive against the foil surface in order that the reflections from the foil surface normal to such incident waves may be reflected directly back along the line of their arrival, so that the reflected and incident waves may produce the beats which cause or generate the serious disturbances in the flow of the air stream. Thus, for the case of 500 M. P. H. such critical angle is 71 degrees with respect to the direction of foil flight. And we have also seen that the cosine of such critical angle, multiplied into the velocity of the waves in air must be equal to the difference between the velocity of the waves in air and the velocity of the foil in its direction of flight. That difference in the case of 500 M. P. H., is 356 feet, for example. Which is the same as saying that the condition of such possible reflection along the same line as the line of incidence is that the sum of rate of foil flight in its direction of flight plus the component of rate of wave propagation in the direction of foil flight, must be equal to the rate of wave propagation in air. This is true for any and all flight velocity conditions up to the velocity of sound or waves in air.

Now in the form of foil shown in Figures 3, 4, 5, 6, 7, 8, 9 and 10 I have provided a series of corrugations or ridges 90 which extend over the nose or leading edge portion of the foil, and backwardly over the foil curves towards the central or body portion of the foil, said corrugations or ridges being substantially parallel to the direction of foil flight. These corrugations or ridges present laterally facing surfaces against which the incident waves must arrive, said surfaces facing both forwardly in the direction of flight and also laterally, or at right angles to the direction of flight, so that any incident waves, to strike such surfaces normally thereto must arrive at a double angle with respect to the direction of flight. This double angle includes a component in the direction of flight and also a component at right angles to such direction. Reference to Figure 10, for example, which is a section on the line 10—10 (also 7—7) of Figure 3, shows that the corrugations at that section provide faces 91 and 92 lying at an angle with respect to each other, and at the location of this section 10—10 (also 7—7), these faces happen to lie at right angles to each other.

Now let us examine the condition of incidence of waves arriving against either of these faces 91 or 92 along lines lying at 71 degrees with respect to the direction of foil flight (for the 500 M. P. H. condition). Such waves, to arrive normal to such surface must be travelling in a plane which plane lies at 71 degrees to the direction of flight; and furthermore, such waves must be travelling in said plane in a direction normal to the surface 91, that is, at 45 degrees with respect to the medial or dividing plane of the corrugation itself (the corrugation being a right angle, or 90 degree corrugation). These conditions are shown in diagram in Figures 18 and 19. There the direction of flight is shown by the line 92$^a$, the critical angle line assumed for 500 M. P. H. (71 degrees) is shown at 93, and the surfaces of the corrugation are shown at 91 and 92 in Figure 19. The waves must arrive along a line lying within the plane 93, so that they may comply with requirements hereinbefore explained; and said waves must arrive along a line 94 (Figure 19) at right angles to the surface 91. Such being the case we find the following; assuming the waves to be travelling at 1089 ft./sec., and that B is the angle of the half corrugation (see Figure 19), then component of velocity of such arriving waves in the direction of flight (but opposed thereto), is $V_0 = 1089 \cos A \sin B$. In other words, this component of velocity is the same as that for the condition of a foil without the corrugations, multiplied by the sine of the half angle of the corrugation. For example, in the case of critical angle of 71 degrees the component in the direction of flight, and no corrugations, is 356 feet, whereas, by use of the surface of the corrugation said component becomes 250 feet, being 356 feet multiplied by the sine of 45 degrees, or .707. Likewise, for any other selected corrugation angle condition the component will be reduced by the sine factor of this new equation.

Now the result of the foregoing is that the presence of these corrugations serves to destroy the condition of balance between the several factors affecting the ability of the incident waves to arrive along the critical angle line for the assumed velocity and be reflected directly back along the same lines, so that the forward component of the reflected waves from such corrugation surface is always less than the difference between the wave velocity and the forward component thereof due to the critical angle for the velocity of flight in question; and the result is that no matter what the velocity of flight may be the reflected waves cannot move out over the same lines as their lines of arrival, and therefore the objectionable beats cannot be produced with consequent disturbances, as long as the corrugations are carried back far enough to reach the point of intersection of the critical angle for the highest intended velocity of flight, with the foil surface, and preferably somewhat back of that point. Thus for example, in the form of Figures 3 to 10, inclusive, these corrugations have been carried back to the 83 degree critical line, or where the foil lies at 7 degrees with respect to the direction of flight, corresponding to 652 M. P. H.

Various forms of corrugation surfaces may be used so as to prevent the non-reflection from any portion of the curve of the foil, and for selected velocities of flight. One such form is that shown by the several sections of Figures 4, 5, 6, 7, 8, 9 and 10. Taking the form there shown, it will be seen that at the 83 degree line (section 8—8) corresponding to critical angle of 652 M. P. H., the incident waves never would reach a position that far back along the foil surface, since we are assuming a normal intended velocity of 500 M. P. H., and 652 is the allowed maximum. Therefore, at that location the foil surface is uncorrugated; and the corrugations commence there and continue forward and over the leading edge and then backwardly over the lower foil surface to the location of the critical angle line for 83 degrees there.

Now, at any location forward of the 83 degree position, the angle of the corrugation is such that the product of cosine A times sine B at such position is the same as the similar product at the 83 degree position, so that as we advance forwardly over the curve of the foil we always have the same non-reflecting characteristic as exists at the 83 degree position. The effect of such condition will be apparent from the discussion heretofore given. Likewise we might have commenced at the critical angle position of 71 degrees corresponding to 500 M. P. H., and formed the corrugations from that point forward so that the product of sine B times cosine A would always be the same as the cosine of 71 degrees.

In Fig. 20 I have shown, by the curve 95 the value of the half angle of the corrugations for the above condition for 652 M. P. H., and by the curve 96 the value of the half angle of the corrugations for the above condition for 500 M. P. H. It will be noted that these curves are plotted between location on foil surface curve, and value of the half angle corresponding thereto. Also, that for the 652 M. P. H. assumption such half angle at the nose (zero critical angle) is approximately 7 degrees, and that for the 500 M. P. H. assumption such half angle at the nose is approximately 19 degrees. That is, at the nose such half angles become equal to the maximum critical angles for the assumed velocities of flight. At intermediate locations these half angles are of intermediate geometric values.

Now when using a variable angle corrugation such as just explained the distance between corrugation centers, measured along the foil (that is, measured at right angles to the direction of flight), must be constant over the entire curve where such corrugations exist; and furthermore the corrugations should not be higher than necessary measured outwardly from the original foil surface. Naturally, if the half angle of the corrugation decreases with fixed distance between corrugations, the height of the corrugations must also increase. That fact appears from comparison of Figures 7, 6, 5 and 4. It is also noted that when the half angle of the corrugation is less than 45 degrees it is not possible for waves to strike the faces of the corrugation walls clear to the bottom of the corrugations and be reflected directly back along the same lines over which they arrived. Consequently such smaller angle corrugations are ineffective over the bottom portions of their walls, and the bottom portions of the corrugations may be modified accordingly, without loss of benefit. Such modifications are shown in the bottom portions of the corrugations at the locations of the sections of Figures 5, 4 and 9. Such modifications consist in curving the lower portions of the corrugations between the lower edges of the slanting side walls, such curves being of a form such that waves striking such curved portions at any point cannot possibly be reflected outwardly therefrom along the lines of incidence.

In Figure 9 I have shown the form of the corrugation at the nose of the foil, being on enlarged scale. The tip portions of the corrugation walls 97 lie at angles of 7 degrees to the medial plane of the corrugation, and the curved connecting portions 98 are of special curvature so that waves travelling past the corrugation edges 99 can not strike any portion of said connecting curves and be reflected back along the same line whence they arrived.

When using such corrugations as above described, they may be set down against the face of the body of the foil, and their depth does not need, at any point, to be greater, or materially greater than their depth, for example at the 45 degree position.

In some cases the corrugations may be of uniform angularity or spread over the entire foil curvature which they occupy, instead of being of special form such as above explained. The purpose and object of these corrugations is to prevent the reflections of waves incident normally against the foil surface, and to prevent the reflection of such waves back along the lines whence they arrived, so as to prevent creation of the beat disturbances.

The corrugations, when used, may be formed or attached to the curved foil surface as distinct additions thereto, or such foil surface may itself be formed with these corrugations therein. In any case it is noted that such corrugations lie parallel to the direction of flight so that the air stream is not required to pass over any rough or irregular surfaces in moving backwardly. In some cases these corrugations may be used as de-icers, or for similar purposes. Thus, in Figure 10 I have shown a series of these corrugations of 45 degree half angle form, and they are formed of flexible material such as sheet rubber or the like. The sheet of such flexible material is stretched over the ridge plates 100 and is drawn, at the intermediate points, against the curved smooth foil surface, by the tension members, such as wires, 101, and the hights and formations of these ridge plates 100 are such that merely by drawing the tension wires 101 up tight the corrugations will be formed and maintained in substantially correct formation and angularity. Within each half corrugation there is provided a tubular air chamber or the like, 102, preferably of rubber, so that the same may be alternately expanded and allowed to contract, by periodical supply of compressed air into these tubes. Upon expansion of the tube it will press against the adjacent corrugation wall, and bend or deflect the same to thereby crack or break ice formations off the corrugation surfaces.

In Figure 10 I have also shown diagrammatically, a tank 103 for compressed air, and a compressor 104 to maintain a supply of compressed air therein; and a timing valve 105, such as a rotary valve driven at more or less uniform speed, and having tubular connections 106 to the individual de-icer tubes 102, or to pairs of said de-icer tubes as shown. With this arrangement, upon operating the valve 105, the compressed air will be supplied to the de-icer tubes in alternation or successively, so that they will be inflated and expanded in succession, the valve 105 serving to permit deflations to occur naturally by exhaust to the atmosphere. The successive inflation and deflation of the tubes or sets of tubes, instead of the simultaneous inflation and deflation of all the tubes as a complete group, serves to make possible the de-icing operation with a smaller tank and compressor unit, and serves to perform the operation with a substantially continuous action, of wave like form over the entire surface of the leading edge of the foil; besides which the interruption to the non-reflecting actions of the corrugations (if such interruption occurs) does not take place over more than a portion of the foil at any one time, even during the de-icing process.

It is further to be noted that I have provided herein, de-icers of tubular form which extend parallel to the direction of flight, and parallel to the air stream, as distinguished from extending transversely thereof, as in previous installations, so that the air stream is never subjected to the need of flowing abruptly over any such transversely extending tubes as in the past. Furthermore, in the present case these de-icing tubes, when used, extend backwardly over the foil surface far enough to reach beyond the "critical zone" for the intended normal velocity of operation, and also these de-icing tubes are so formed that they merge smoothly with the uncorrugated foil surface. Thus there are not formed any points at which ice might tend to accumulate, and especially these de-icers actually perform their de-icing functions clear back over the foil surface to locations backward of the "critical zone." This will overcome the tendency of ice to accumulate at such critical zone where such accumulation would not only be objectionable from the ice standpoint, but where such accumulated ice would be most harmful from the standpoint of tending to accentuate irregularities in the flow of the air stream.

In Figure 1a I have shown in plan, and more or less diagrammatically a typical form of airplane having these corrugations applied to the leading edges of its wings, as shown at 107 and 108; and similar corrugations applied to the nose portion of the fuselage at 109. Manifestly, the principles herein set forth may be applied to any selected portion of the ship where the conditions seem to justify such application. Incidentally the ship shown in Figure 1a is a two propeller ship, the propellers being shown at 110 and 111.

Various embodiments of my present invention lend themselves readily to application to ships which are built by moulding or other similar operations, such as plastics, moulded ply-wood, and the like. Thus, for example, in Figure 1b I have shown the section through a moulded foil arrangement, having the leading edges of the same provided with corrugations such as herein disclosed, or with said leading edge portion otherwise formed to comply with other features or embodiments of the invention.

In Figure 15 I have shown a propeller blade 112 having the leading edge portion thereof provided with corrugations or otherwise formed to incorporate features of my present invention, along the portion 113 thereof where the velocities are high enough to justify such treatment. Of course the linear velocity of any given section of the blade or foil will depend on the R. P. M. and also the radius at which such section is taken, and these velocities are very high. By means of application of the features herein disclosed the objectionable disturbances at very high velocities may be avoided, and the propellers operated at greatly increased velocities.

Now it is evident that generally speaking I have provided foil structures or arrangements such that the objectionable reflections cannot take place thereon or therefrom. Such result may also be secured by suitable formation or treatment of the foil surface at and adjacent to the critical zone that this result is secured by provision of an air surface or body at and adjacent to such critical zone, which air surface or body is itself of a nature which will prevent or avoid such reflections. For example, in Figure 13 I have provided the upper and lower foil surfaces 114 and 115 with slotted or similar openings 116 and 117, said openings being located at and adjacent to the critical zones for the intended normal velocity of foil flight; and these openings may be either continuous over the entire length of the foil, or may comprise a series of narrow slotted openings, preferably connected together by means of a passage or channel, such as 118 and 119 within the body of the foil. These passages or channels 118 and 119 may be connected together by one or more vertically extending passages 120, so that the air bodies and pressures within the two channels may equalize or neutralize each other. With such an arrangement it will be seen that if the densations and rarefactions arriving at the upper surface, for example, come alternately with respect to the arrivals of the densations and rarefactions arriving at the lower surface, all said densations and rarefactions may be brought together by the cross-connections or passages 120 in such manner that they will neutralize or balance each other and effectively prevent any reflections from occurring. In some cases it may be desirable to so form these cross-connections or passages 120 that their lengths may be adjusted. For this purpose I have shown them as being provided with the telescoping portions 121, including the arms 122 and 123. Suitable control levers 124 and 125 are provided for shifting these arms back and forth to thereby adjust the telescoping section; and thus it is possible to vary the length of passage between the channels 118 and 119. The frequency or period (natural) of this passage will depend on its length as well as on the temperature of the air, so that by such adjustment it is possible to bring about the desired neutralizing action, notwithstanding changes in the frequency of the arriving waves, and other factors. The frequency of the arriving waves may change, for example, if the propeller speeds are changed.

Figure 25 shows another arrangement similar to that of Figure 13, but in Figure 25, which is a perspective view, the openings 116 are clearly shown as narrow slots through the foil surface at the critical zone, and leading directly to the longitudinally extending channels.

In Figures 23 and 24 I have shown still another arrangement embodying features of my present invention. In this case the slots 126 in the foil are narrow, and their edges are bent or formed downwardly as shown at 127 in Figure 24. By this means the foil material between the slots is brought into a non-reflecting form, so that reflections are prevented from such intermediate foil portions. It will also be noted that in Figure 23 I have shown a three bladed propeller 128 in advance of the foil. In such case the densations and rarefactions will arrive at the upper and lower foil surfaces in alternation, as heretofore referred to. In the form of Figures 23 and 24 there is provided the cross-connection 129 between the channels 130 and 131 along the inner faces of the upper and lower foil surfaces; and this cross-connection may be of adjustable length if desired.

Now it will be noted that in each of the arrangements of Figures 13, 25, and 23–24, respectively, there is made provision for avoidance or prevention of reflections of undesirable kind by neutralization of effects on the upper and lower foil surfaces; and that in each of these cases there are provided openings in said foil surfaces at and/or adjacent to the zone of disturbance, or critical zone; and that in each of said cases these openings in the upper and lower foil surfaces are cross-connected. In some cases such cross-connections may be eliminated, as the body of air in the passage will of itself constitute a cushion, effective through the slotted openings to prevent any material or substantial reflection.

In Figures 21 and 22 I have shown still another embodiment of features of my invention. In this case the surfaces of the foils are provided with openings at or adjacent to the zone of disturbance, and I have provided in conjunction with these openings, suitable means to draw off, in more or less continuous fashion, the air on the surface of the foil, at such a rate as will effectively prevent the reflections of waves. In such case I have provided the openings 132 and 133 in the upper and lower foil surfaces, along the critical zones thereof, and channels 134 and 135 within the foils and connected to said openings. The motors 136 and 137 are provided for driving the propellers 138 and 139. The channels 134 for openings in one foil may be connected to the air intake for the motor 136, and the channels 135 for openings in the other foil may be connected to the air intake for the motor 137; or the channels for both foils may be connected together, the motors taking air from such so-connected network. In any case, however, the motors receive air from these channels, thereby draining air from the foil surfaces at and adjacent to the critical zones. By this means reflections are prevented, and this result is secured without the need of any reformation of the foil contours.

It is to be noted that although I have herein given certain examples of frequencies and surge lengths based thereon, still these are given merely by way of illustration. Furthermore, it is to be understood that the incident waves causing the disturbances may be initiated by many other instrumentalities than the propellers. For example, the engine exhausts will set up disturbances in the surrounding air which may be transmitted in various manners to the air in such position that reflections of objectionable nature will result. Still, any waves reaching the foil surfaces on the critical angle for the velocity in question must be taken account of, and the principles herein set forth are applicable.

It is further to be noted that with increasing sizes of foils, both as to length and width, as well as thickness, the features herein disclosed may be more and more conveniently applied, taking into account also the trend towards higher and higher foil velocities.

It is also noted that due to the fact that variations of air pressure do not materially affect the velocity of waves therein, airplanes incorporating the features herein disclosed may be flown with equal satisfaction at various altitudes, without the need of making any adjustments to meet such variations of altitude; and furthermore although variations of temperature do affect the velocity of waves in air, still, as already set out it is necessary to make provision for suitable latitude of compensation to both sides of the exact critical angle or zone for a specified normal flight velocity, in order to take care of practical operating conditions. In so doing it will be found that compensation has also been made for a wide range of temperature variations, so that the planes can be operated under expected conditions of operation with varying seasons, latitudes, and elevations. In this connection it is also noted that in the case of embodiments of the invention wherein cross-connections such as shown in Figures 13 and 25 are used, the pilot may readily adjust the same according to changes of wave velocity due to temperature changes, as well as for other purposes. In such case he will make proper adjustment until the desired neutralization is secured.

While I have herein shown and described only certain embodiments of features of my present invention, still I do not intend to limit myself thereto, except as I may do so in the claims to follow.

Referring to Figure 1a, it will be noted that the leading edge portions of the foils cant backwardly at a slight angle B'. Such construction may be adopted if desired. In this case such angle B' corresponds somewhat to a slight amount of corrugation angle, generally of not over a few degrees. When the leading edge of such a canted foil strikes the air this angle will affect the forward component of reflected waves, and if such a canted leading edge is corrugated the side faces of the corrugations should be so formed that they lie at equal angles to the direction of flight, and furthermore, in such case the corrugation angle may be modified in amount depending on the amount of such cant. In any case, the said corrugation angle should be modified to take into account the amount of such cant according to the principles herein set forth.

Although, in the arrangement shown in Figures 21 and 22 air is withdrawn from the foil surfaces at and adjacent to the critical zone by taking such air to the motor intakes, still it is manifest that such removal might be effected in many other ways, taking the air away from the foil surfaces at and adjacent to the critical zone so as to avoid reflections at such locations. For example, the duct or ducts connected to the slits in foil surfaces might be connected to a duct or ducts reaching to some rear portion of the foil, provided the air pressure conditions at such location were such as to tend to draw the air inwardly through the slits; or other positive mechanical means than the motors might be provided for drawing the air positively inwards through the slits for the purposes herein set forth.

I claim:

1. An airplane intended for normal free horizontal flight at air velocities of substantially 500 miles per hour and upwards, including wing foils and a power propeller in advance of said wing foils, said propeller producing disturbances in the air current flowing against said wing foils, each wing foil having a section which curves continuously and regularly from the leading edge portion of said foil to a position substantially parallel to the mean chord line of the foil, and said wing foil having a composite upper surface in that portion of the foil lying substantially between a positive slope of 19 degrees with respect to the mean chord line of the foil and a positive slope of 7 degrees with respect to said mean chord line, said composite upper surface including an exposed portion of sound non-reflecting material forming the exposed surface of said foil in said composite section, whereby disturbance waves in the air arriving against said foil in a direction substantially normal to the foil surface at free flight velocities of substantially 500 miles per hour and upwards strike said sound non-reflecting surface and suffer damping by said surface with substantial avoidance of direct reflection of said disturbances and avoidance of production of beats, substantially as described.

2. An airplane intended for normal free horizontal flight at air velocities of substantially 500 miles per hour and upwards, including wing foils and a power propeller, each wing foil having a section which curves continuously and regularly from the leading edge portion of said foil to a position substantially parallel to the mean chord line of the foil, and said wing foil having a composite upper surface in that portion of the foil lying substantially between a positive slope of 19 degrees with respect to the mean chord line of the foil and a positive slope of 7 degrees with respect to said mean chord line, said composite upper surface including an exposed portion of sound non-reflecting material forming the exposed surface of said foil in said composite section, whereby disturbance waves in the air arriving against said foil in a direction substantially normal to the foil surface at free flight velocities of substantially 500 miles per hour and upwards strike said sound non-reflecting surface and suffer damping by said surface with substantial avoidance of direct reflection of said disturbances and avoidance of production of beats, substantially as described.

3. An airplane intended for normal free horizontal flight at air velocities of substantially 500 miles per hour and upwards, including wing foils and a driving means, each wing foil having a section which curves continuously and regularly between a positive slope of substantially 19 degrees with respect to the mean chord line of the foil and a positive slope of substantially 7 degrees with respect to said mean chord line, said portion having a composite upper surface, said composite upper surface including an exposed portion of sound non-reflecting material forming the exposed surface of said foil in said composite section, whereby disturbance waves in the air arriving against said foil in a direction substantially normal to the foil surface at free flight velocities of substantially 500 miles per hour and upwards strike said sound non-reflecting surface and suffer damping by said surface with substantial avoidance of direct reflection of said disturbances and avoidance of production of beats, substantially as described.

THOS. A. BANNING, Jr.

REFERENCES CITED

The following references are of record in the file of this patent:

UNITED STATES PATENTS

| Number | Name | Date |
| --- | --- | --- |
| 1,096,256 | Lang | May 12, 1914 |
| 1,773,281 | Scott | Aug. 19, 1930 |
| 1,773,280 | Scott | Aug. 19, 1930 |
| 2,071,012 | Adams | Feb. 16, 1937 |
| 1,361,277 | Mott | Dec. 7, 1920 |
| 2,041,792 | Stalker | May 26, 1936 |
| 2,164,721 | Price | July 4, 1939 |
| 1,810,693 | Alfaro | June 16, 1931 |
| 2,322,632 | Harper | June 22, 1943 |
| 1,973,124 | Swan et al. | Sept. 11, 1934 |
| 1,364,197 | Heath | Jan. 4, 1921 |
| 1,704,612 | Johnson | Mar. 5, 1929 |
| 2,304,686 | Gregg | Dec. 8, 1942 |

FOREIGN PATENTS

| Number | Country | Date |
| --- | --- | --- |
| 542,878 | Great Britain | Jan. 30, 1942 |
| 269,758 | Italy | Dec. 2, 1929 |